United States Patent [19]
Inui et al.

[11] Patent Number: 6,031,816
[45] Date of Patent: Feb. 29, 2000

[54] OPTICAL RECORDING MEDIUM, METHOD FOR MANUFACTURING THE SAME, AND OPTICAL INFORMATION RECORDING AND REPRODUCING DEVICE USED WITH RESPECT TO THE SAME

[76] Inventors: Tetsuya Inui, 14, Inyo-cho, Nara-shi; Hideaki Sato, 109-13, Wakatsuki-cho, Yamatokoriyama; Junichiro Nakayama, 200-8, Yakuoji Tawaramoto-cho, Shiki-gun; Naoyasu Iketani, 2613-1-1024, Ichinomoto-cho, Tenri-shi; Michinobu Mieda, 422-6, Iwami Miyake-cho, Shiki-gun; Yoshiteru Murakami, 16-40-108, Takagihigashi-cho, Nishinomiya-shi; Junji Hirokane, 1-194-16, Minamikyobate-cho; Akira Takahashi, 1-1-45-104, 5-chome Suzaku, both of Nara-shi, all of Japan

[21] Appl. No.: 09/330,495

[22] Filed: Jun. 11, 1999

Related U.S. Application Data

[62] Division of application No. 08/890,401, Jul. 9, 1997, Pat. No. 5,933,411.

[30] Foreign Application Priority Data

Jul. 9, 1996 [JP] Japan ..................................... 8-179255
Oct. 4, 1996 [JP] Japan ..................................... 8-263880

[51] Int. Cl.[7] ...................................................... G11B 7/24
[52] U.S. Cl. ........................................ 369/275.4; 369/275.3
[58] Field of Search ............................... 369/275.6, 275.3, 369/275.1, 275.2, 58, 54, 52–53, 47, 44.26, 44.13, 44.29, 44.36, 277, 109, 111

[56] References Cited

U.S. PATENT DOCUMENTS

| | | | |
|---|---|---|---|
| 5,210,738 | 5/1993 | Iwata et al. | 369/275.1 |
| 5,339,302 | 8/1994 | Takahashi et al. | 369/54 |
| 5,537,373 | 7/1996 | Horikiri | 369/44.13 |
| 5,615,205 | 3/1997 | Belser | 369/275.4 |
| 5,933,411 | 8/1999 | Inui et al. | 369/275.4 |

*Primary Examiner*—Ali Neyzari
*Attorney, Agent, or Firm*—Dike, Bronstein, Roberts & Cushman, LLP; David G. Conlin; William J. Daley, Jr.

[57] ABSTRACT

An optical disk has address recording sections each of which has a wobbled part of one of side walls of a groove. Each address recording section is formed by providing convexes of a groove in an adjacent land so as to widen the groove. With the wobbles thus provided in a concavo-convex form, address information is recorded. Besides, the address recording sections thus provided in the grooves are linearly disposed in radial directions of the optical disk. By thus arranging the optical disk on whose grooves and/or lands information is recorded, mixing of wobble frequency components in reproduced information signals does not occur, the sector method is applicable to the optical disk, and information signals of high quality can be obtained.

3 Claims, 18 Drawing Sheets

OPTICAL RECORDING MEDIUM, METHOD FOR MANUFACTURING THE SAME, AND OPTICAL INFORMATION RECORDING AND REPRODUCING DEVICE USED WITH RESPECT TO THE SAME

This application is a divisional of U.S. application Ser. No. 08/890,401, filed Jul. 9, 1997, now U.S. Pat. No. 5,933,411, the teachings of which are incorporated herein by reference.

FIELD OF THE INVENTION

The present invention relates to an optical recording medium to and from which information is recorded and reproduced by the use of light, a method for manufacturing the optical recording medium, and an optical information recording and reproducing device used with respect to the optical recording medium.

BACKGROUND OF THE INVENTION

A rapid technological innovation has recently been achieved as to the optical recording medium to and from which signals are recorded and reproduced by the use of light. Numerous attempts have been made particularly to increase recording capacity, working out various element technologies for this purpose.

Among such technologies there are those relating to a disk-shape medium to which information is recorded, that is, a so-called optical disk. The optical disk usually has a configuration wherein a recording medium layer is provided on a substrate having tracks thereon. In this case, by making a light spot trace the tracks, the light spot is caused to accurately follow lines of fine recording marks.

In the case of the optical disk, when tracks are formed on the substrate, address information of the tracks are also marked on the tracks at the same time. Specifically, pits indicating track numbers, sector numbers, etc., are formed on the tracks or between the tracks, and by reading them the address information can be obtained.

In another method for marking address information, wobbled grooves are used. To be more specific, as shown in FIG. 13, both side walls of a groove 101 provided on an optical disk (they are also side walls of adjacent lands 102) are wobbled in a direction orthogonal to a longitudinal direction of the track (the method using such grooves is hereinafter referred to as both-sidewobble method). A wobble frequency obtained therefrom is modulated by a certain method, and address information is allocated to it. In this case, by setting the wobble frequency higher than frequencies to which the light spot is capable of following, the light spot does not follow the wobble frequency during tracking and wobble frequency components are always added to a tracking signal. Therefore, by detecting the wobble frequency components, the address information can be obtained. Incidentally, as a method for increasing the capacity of the optical disk, a land/groove recording method has been proposed. Conventionally signals are recorded on either the grooves or the lands between the grooves, but in contrast, the above method is for recording information on both the grooves and lands. In this case, it is impossible to accurately record address information to lands 102 wobbled in a manner as shown in FIG. 13, since a width of the land 102 varies with wobbles of the two adjacent grooves 101.

As a method to solve this problem, a method using grooves one of whose side walls is wobbled, that is, a single-side-wobble method, is disclosed by the Japanese Publication for Laid-open Patent Application No.5-314538/1993 (Tokukaihei No.5-314538). The method is applied to an optical disk having grooves 111 and lands 112 thereon wherein only one side wall of each groove 111 is wobbled, as shown in FIG. 14, so that address information is recorded, using a wobble frequency obtained from the wobble.

However, in the case of the both-side-wobble method and the single-side-wobble method both, every groove (or land) has a wobbled side wall, that is, a portion being tracked always has a wobbled side wall. Therefore, a reproduction signal of information includes wobble frequency components since mixture of wobble frequency components occurs when information signals are recorded or reproduced. As a result, signal quality deteriorates.

Besides, due to the above-mentioned signal mixture, it is necessary to set the wobble frequency in a frequency band different from the frequency band for the information signal, and hence the wobble frequency is set much lower than the frequency of the information signal. Therefore, the spatial wavelength of the wobble frequency becomes long, and accordingly each domain has to be long so as to express each piece of address information. As a result, making divisions between addresses clear and precise is failed.

This does not signifies much in the case of signals to be continuously transmitted, such as video signals or sound signals. However, in the case where an optical disk is used as a memory of a computing device wherein signal transmission is frequently carried out, signals are grouped into blocks when transmitted, and it is necessary to arrange data by a so-called sector method. In this case, the above matter becomes a serious problem.

Besides, since the width of the grooves or the lands varies in some areas, there arise a problem that the beam spot may have an offset, and besides, a problem that the offset is difficult to correct.

There are more methods for providing address information in the case where the land/groove recording method is used. For example, an exclusive address method and a common address method are reported by "Nikkei Electronics" (Nov. 6, 1995, p. 168).

The former is a method whereby at every sector in both the lands and grooves, a pre-pit is provided exclusively for the sector. However, since it is necessary that the pit width is sufficiently narrower than the track width, the pre-pits cannot be formed by the use of a light beam used for forming the tracks. Thus, this method has a defect of making it difficult to manufacture optical disks.

By the latter, that is, the common address method, as shown in FIG. 15, pit series 123 are provided on borders between grooves 121 and lands 122 so that each pair of adjacent groove 121 and land 122 share pit series 123. In this case, a light spot 124 always tracks off the center of pit series 123 when reproducing the pit, during both the tracking operations with respect to the grooves 121 and lands 122. Therefore, there arises a problem that the signal quality is low.

Further, when the light spot 124 passes the pit series 123, the light spot 124 does not tracks on a center line of the pit series 123, thereby causing a great off-set to be added to the tracking signal. Since the pits are intermittently provided, the tracking signal obtained from the pits is also intermittent, but it comes to a great off-set on the average.

A tracking servo system usually does not respond to the tracking signal itself obtained from the individual pit since the pit frequency is sufficiently higher than a frequency band of the tracking servo system. However, since the pit region is considerably long in the present case, the tracking signal is averaged through out the pit region, thereby becoming a signal having a great off-set, to which the servo system responds. As a result, a signal having great spikes is generated when the light spot passes through the pit region. An actuator of the tracking servo system responds to the signal having spikes in the case where the pit region is considerably long, thereby causing a problem of transient response, which reversely affects the signal recording and reproduction.

SUMMARY OF THE INVENTION

The object of the present invention is to provide an optical recording medium which has the following properties when the land/groove recording method is applied: (1) mixing of wobble frequency components in the information signals does not occur; (2) the sector method is applicable thereto without difficulties; and (3) information signals of high quality is reproduced. It is also the object of the present invention to provide a method for manufacturing the optical recording medium and to provide a n optical information recording and reproducing device for the use with respect to the optical recording medium.

To achieve the above object, an optical recording medium of the present invention, which has a plurality of lands and grooves between the lands, each of the lands and the grooves serving as a track on which a light beam is projected for recording, reproducing, and erasing information, is characterized in that each track has at least one wobble section so that address information is recorded therein, the wobble section having a dispersively wobbled side wall of either the groove or the land.

With the aforementioned arrangement, in the case where information is recorded in regions other than the region corresponding to the wobble section, the mixing of a wobble signal in an information signal does not occur, thereby causing no deterioration of signal quality. Therefore, information signals of high quality can be obtained. On the other hand, by recording address information by using wobbles, address signals can be surely detected without affecting the information signals, during recording, reproducing, and erasing operations.

Furthermore, in the case where the optical recording medium is an optical disk, the wobble sections provided on the tracks on the optical disk may be linearly disposed in a radial direction of the optical disk.

In the above arrangement, regions other than those corresponding to the wobble sections, that is, regions where information is recorded, are adjusted in radial directions of the optical disk since the wobble sections are linearly disposed in radial directions of the optical disk. Therefore, timings to detect the address signals are taken with precision, thereby enabling secure detection of the address signals during access operations to other tracks. As a result, speedy access is achieved.

Furthermore, in the case where the optical recording medium is an optical disk, the wobble sections provided on adjacent tracks may be disposed at respective positions in different directions from a center of the optical disk.

With the above arrangement, it is possible to provide the wobble sections in accordance with a line velocity, and make the recording density substantially constant from the innermost track to the outermost track. As a result, the recording capacity can be extended.

An optical information recording and reproducing device of the present invention is characterized in comprising (1) a photodetector for detecting reflected light obtained by projecting a light beam on the optical recording medium, and (2) an operational unit for detecting a tracking signal in accordance with a signal supplied from the photodetector and extracting wobble frequency components due to the wobble sections out of the tracking signal.

In the foregoing arrangement, the tracking signal is obtained by projecting the light beam onto the optical recording medium. Then, the wobble frequency components are extracted out of the tracking signal. By doing so, the wobble signals are detected without affecting the information signals.

The optical information recording and reproducing device of the present invention may be arranged so as to comprise (1) a photodetector for detecting a quantity of reflected light obtained by projecting a light beam on the optical recording medium, and (2) an operational unit for detecting changes in the quantity of the reflected light and extracting wobble frequency components due to the wobble section.

In the above arrangement, changes in the width of the groove or the land cause changes in the quantity of the reflected light due to diffraction effects. Therefore, by detecting the quantity of the reflected light, the wobble frequency components can be extracted. Therefore, the detecting system for detecting the tracking signals is not required to be capable of highspeed response. Consequently, it is possible to provide an inexpensive detecting system.

A method for manufacturing an optical recording medium of the present invention is characterized in comprising the steps of (a) providing a photosensitive material over a substrate, and (b) selectively exposing the photosensitive material in a shape of the wobble section by projecting two light beams with a distance therebetween in a direction orthogonal to a lengthwise direction of the track and swinging one of the two light beams in the direction orthogonal to the lengthwise direction of the track.

By the aforementioned method, the amplitude of the wobble is freely controlled by changing the amount of the shift of the light beam in the direction orthogonal to the lengthwise direction of the tracks. Therefore, a shape of the wobble section is freely controlled. Accordingly, the wobble sections where only one side wall of either the groove or the land is wobbled can be easily formed.

For a fuller understanding of the nature and advantages of the invention, reference should be made to the ensuing detailed description taken in conjunction with the accompanying drawings.

DESCRIPTION OF THE PREFERRED EMBODIMENTS

First Embodiment

Figure 1:
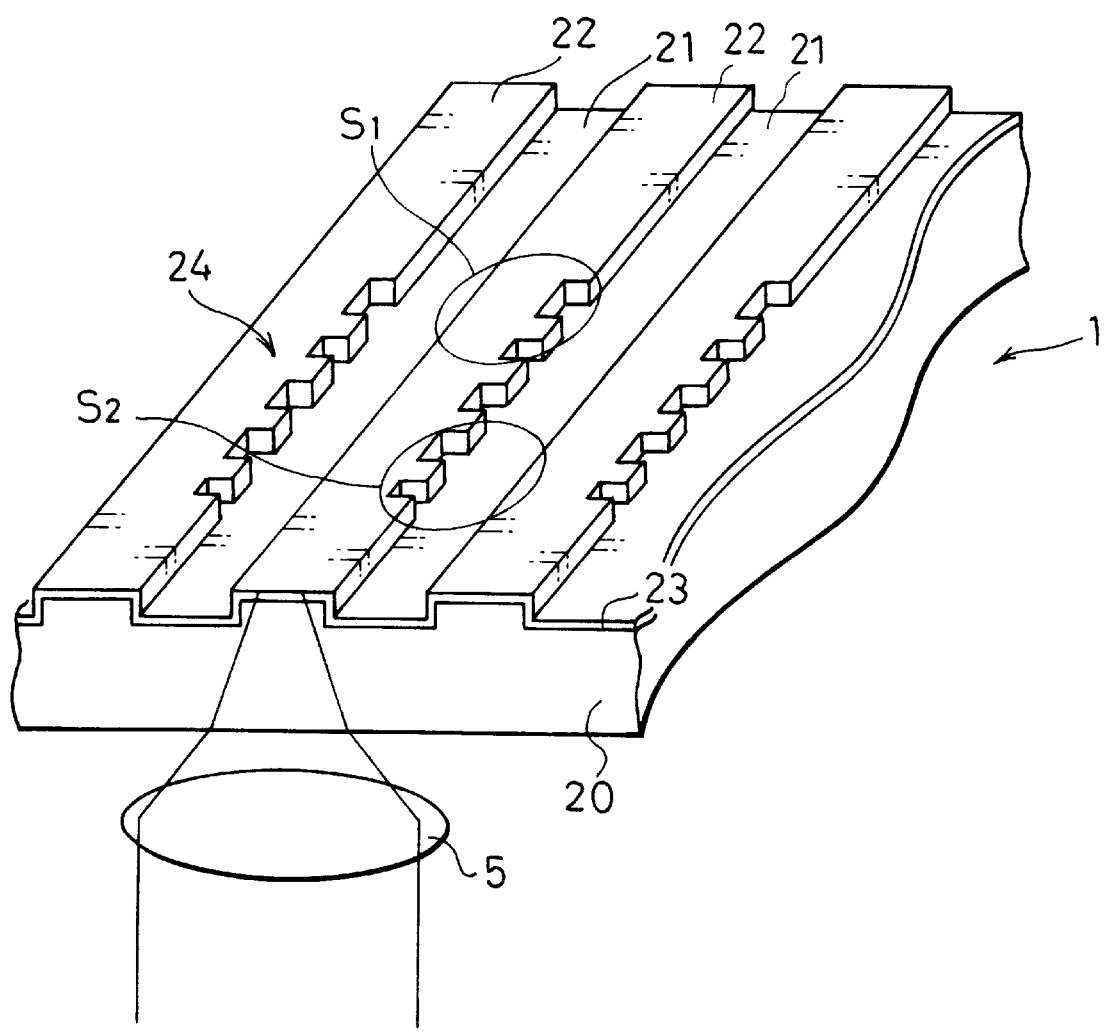
FIG. 1 is a perspective view illustrating an arrangement of an optical disk in accordance with a first embodiment of the present invention.

The following description will discuss a first embodiment of the present invention, while referring to FIGS. 1 through 12.

An optical information recording and reproducing device in accordance with the present embodiment is as follows. As illustrated in FIG. 2(a), the optical information recording and reproducing device has a detecting system for reproducing information recorded in an optical disk (optical recording medium) 1.

A light beam emitted by a semiconductor laser 2 of the detecting system is parallelized by a collimating lens 3, then passes through a beam splitter 4. Thereafter, the light beam is converged by an objective lens 5 onto the optical disk 1. Reflected light from the optical disk 1 returns to the beam splitter 4 through the objective lens 5. Thereafter, the light is deflected by the beam splitter 4 and enters a beam splitter 6. The light is split into two light fluxes by the beam splitter 6, and one of the two is converged onto a photodetector 9 via a converging lens 7 and a cylindrical lens 8.

As shown in FIG. 2 (b), the photodetector 9 is a servo-use detector having quaternary light receiving surfaces 9a, 9b, 9c, and 9d, each of which is connected to an operational circuit (operational unit) 10. Herein, due to the cylindrical lens 8, a shape of a light spot formed on the light receiving surfaces 9a, 9b, 9c, and 9d changes to an oval shape which varies with focus irregularities. Therefore, let quantities of signals obtained at the light receiving surfaces 9a, 9b, 9c, and 9d be A, B, C, and D, respectively, then a focus error signal is obtained by calculating A+D-(B+C) in the operational circuit 10.

Figure 2B:
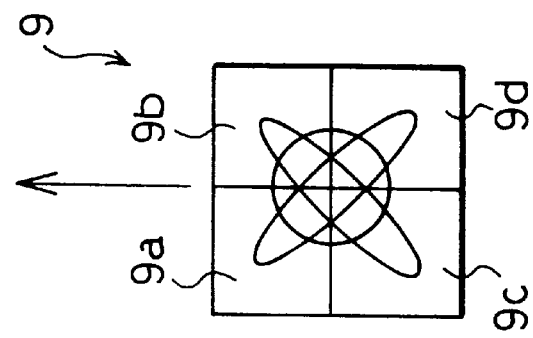
FIG. 2(b) is a plan view illustrating a light receiving surface of a photodetector provided in the optical information recording and reproducing device.
Figure 2A:
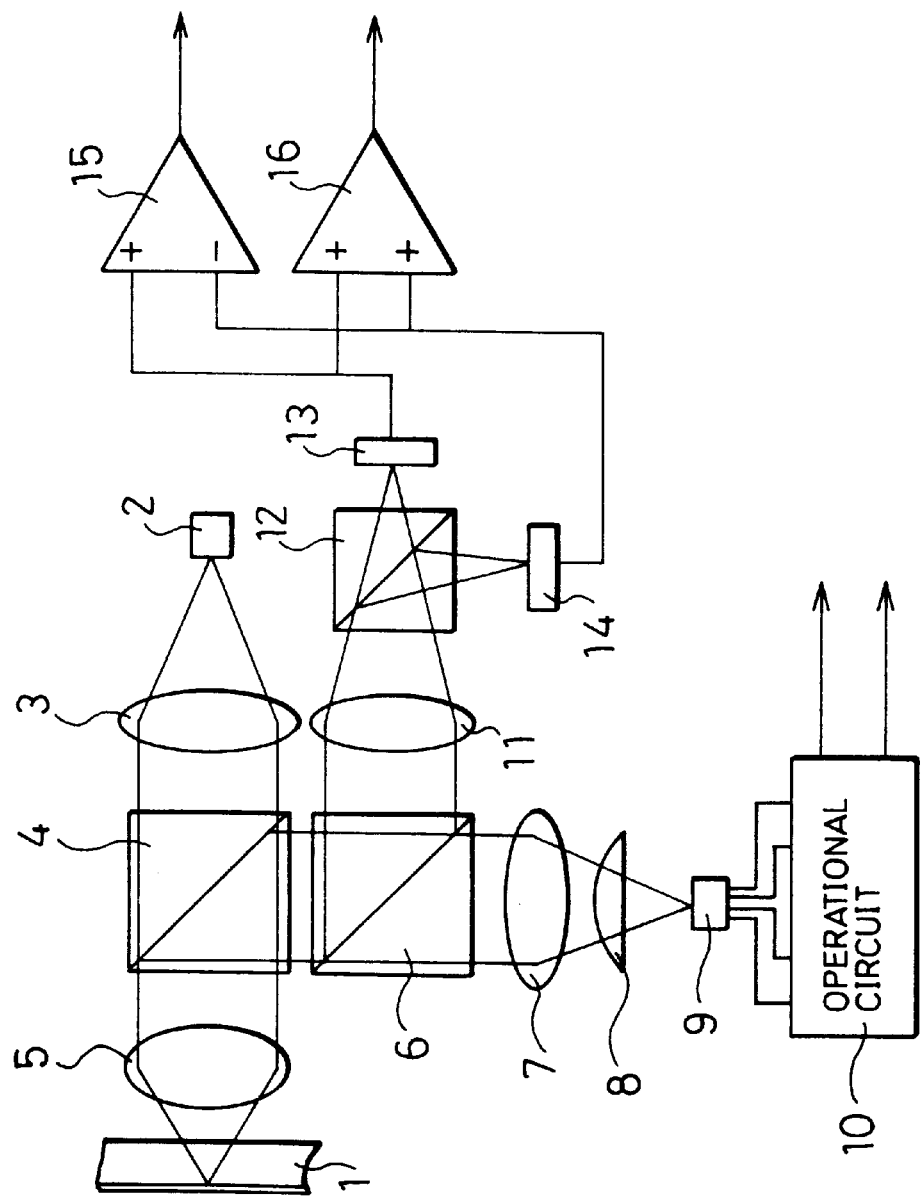
FIG. 2(a) is a view illustrating an arrangement of an optical information recording and reproducing device to be used with respect to the optical disk.

In the case where a direction (direction indicated by an arrow) from the light receiving surface 9c to the light receiving surface 9a in FIG. 2(b) conforms to a track direction, a track error signal is found by calculating A+C-(B+D). This calculation is also performed by the operational circuit 10. Based on a tracking signal obtained from the track error signal, a tracking operation is carried out with respect to a track on the optical disk 1.

On the other hand, the other one of the light fluxes which is not transmitted but reflected by the beam splitter 6 is projected on a polarizing beam splitter 12 through a converging lens 11, and is divided into two light fluxes by the polarizing beam splitter 12. The light fluxes thus obtained are converged onto photodetectors 13 and 14, respectively. Differential reproduction is carried out with respect to outputs of the photodetectors 13 and 14 by an operational amplifier 15, and as a result information recorded in the optical disk 1 is obtained in the form of magneto-optical signals (information signals).

The reflected light from the optical disk 1 is detected either (1) by computing a sum of the light quantities (=A+B+C+D) detected by the quarternary light detecting surfaces of the photodetector 9 or (2) by using an amplifier (operational unit) 16 which computes a sum of outputs of the photodetectors 13 and 14 detecting the magneto-optical signals.

Note that the above-described arrangement of the optical information recording and reproducing device is merely one example, and an arrangement having the same function can be achieved with various optical parts.

FIG. 1 illustrates a configuration of the optical disk 1 having address recording sections (wobble sections) 24 which characterize the present invention. The optical disk 1 is composed of a transparent substrate 20, and a recording medium layer 23 provided on the transparent substrate 20. On the transparent substrate 20, grooves 21 and lands 22 each of which serves as a track are provided in a concentric or seoieral form. Information signals are recorded in the recording medium layer 23.

The light beam converged by the objective lens 5 forms light spots $s_1$ and $s_2$ on the land 22 and the groove 21, respectively. In other words, the light spot $s_2$ formed by the light beam follows the groove 21, while the light spot $s_1$ follows the land 22.

The recording medium layer 23 is made of either (1) a material such as rare earth-transition metal alloy used for magneto-optical recording or (2) a phase transition material used in the case where signals are recorded by utilizing the crystal-amorphous phase transition due to temperature changes. The recording medium layer 23, which du e to the structure thereof exhibits a super resolution effect, is capable of reproducing a recording mark smaller than the light spot.

Therefore, even though information is recorded on the grooves 21 and the lands 22 both, the information can be reproduced without crosstalk between respective signals. As a result, information can be recorded on the grooves 21 and the lands 22 both, resulting in enhancement of the recording density.

Figure 4:
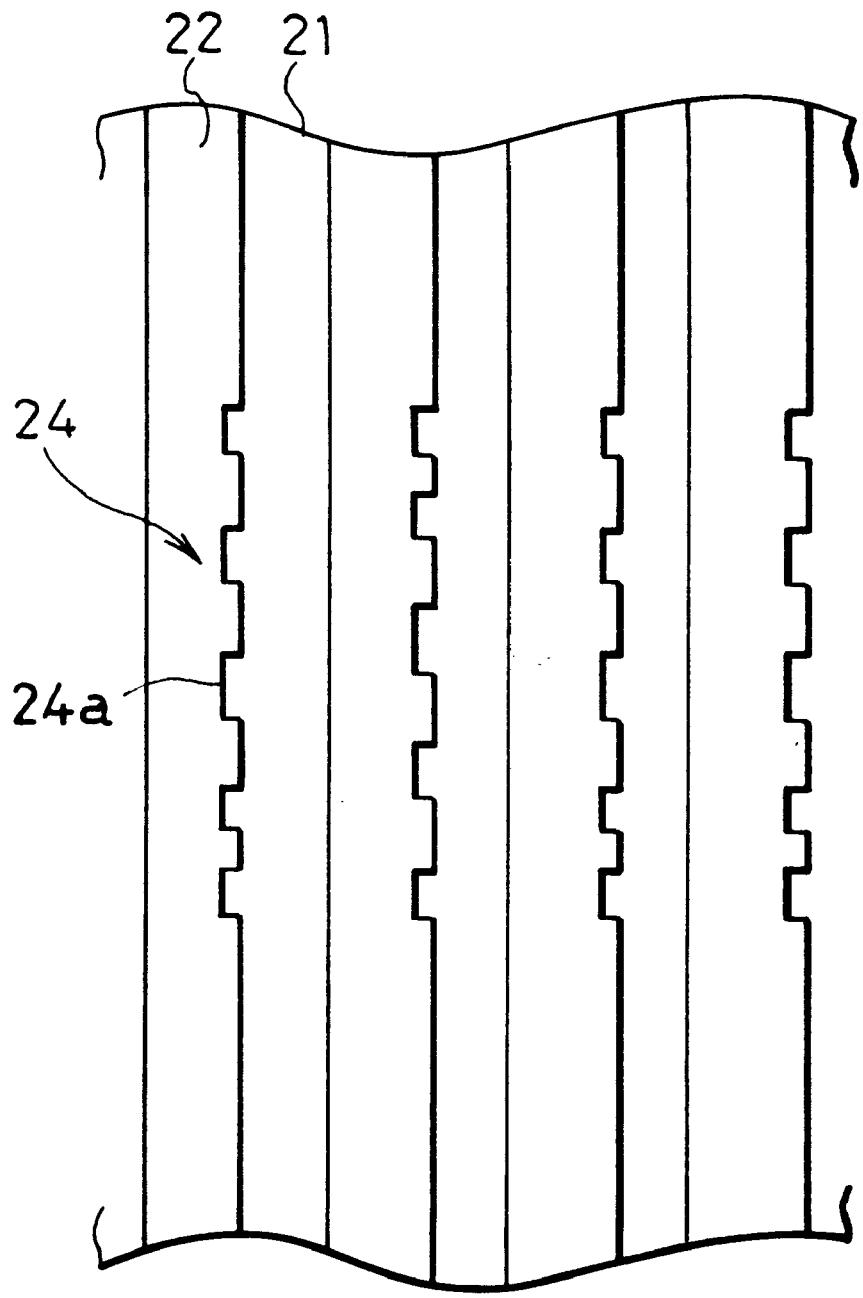
FIG. 4 is a plan view illustrating an example of a shape of the address recording sections.

On a part of one of side walls of each groove 21 (which is one of side walls of each land 22), which constitutes a border between the groove 21 and an adjacent land 22, there is provided an address recording section 24. As illustrated in FIG. 4 which is a plan view of FIG. 1, in each address recording section 24, the groove 21 has a plurality of convexes 24a therein (which constitute concaves in the land 22), and as a result the side wall of the groove 21 wobbles, having concaves and convexes in a radial direction of the optical disk 1. In other words, the groove 21 is widened so as to form the convexes 24a. Address information is recorded by utilizing such a wobble of the side wall. Herein, a frequency (wobble frequency) of changes of the side wall width in the address recording section 24 is set higher than a response frequency of the tracking servo system.

Figure 3:
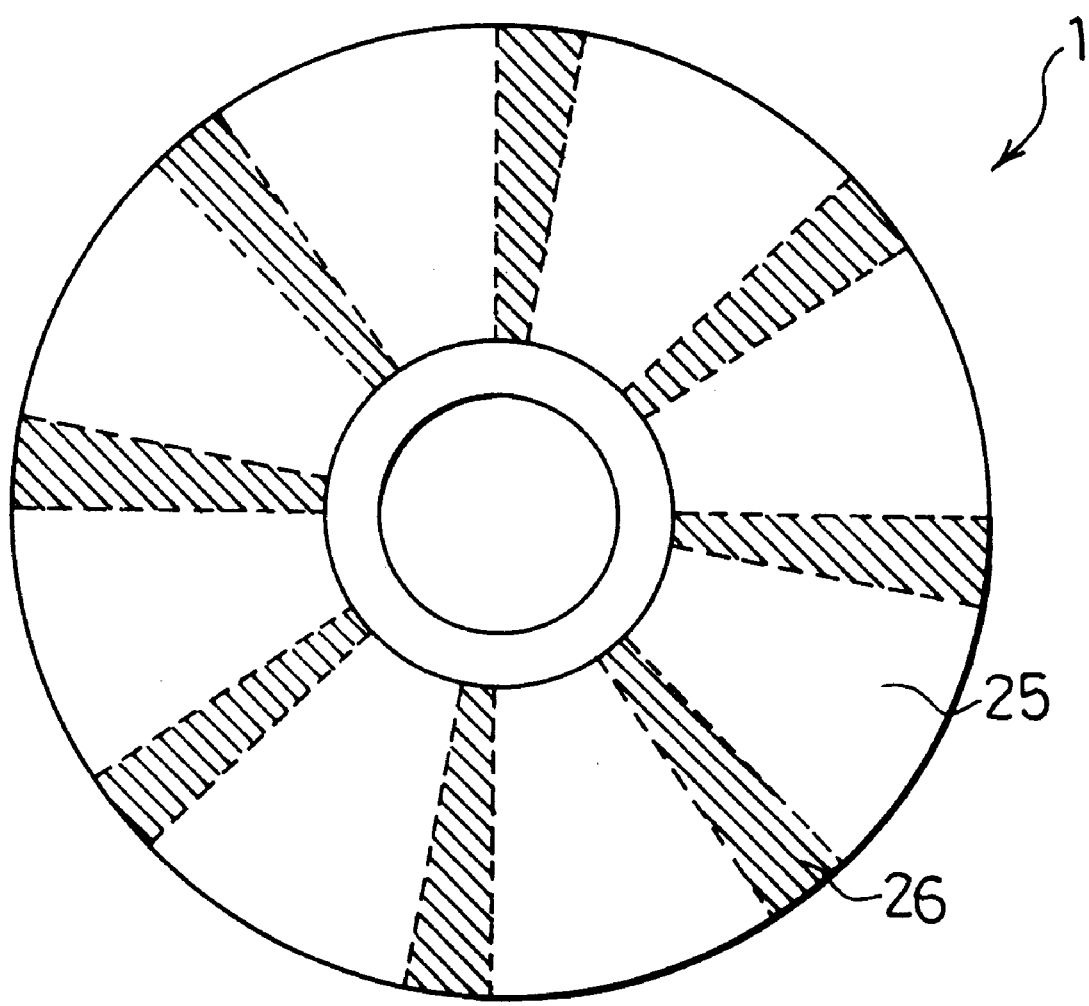
FIG. 3 is a plan view illustrating an example of an arrangement of address recording sections on the optical disk.

Positions of the address recording sections 24 thus provided in all the grooves 21 are adjusted in radial directions of the optical disk 1. By thus arranging the address recording sections 24, regions 26 as shown in FIG. 3 are formed. A single region 26 is, or a plurality of regions 26 are, radially provided, and information recording sections 25 are provided between the regions 26. Therefore, the tracking operation is carried out alternately with respect to the regions 26 (address recording sections 24) and the information recording sections 25 while the light spot follows one track.

In the case where the address recording sections 24 are dispersively provided in the above-described manner, information recorded in one information recording section 25 following to one address recording section 24 is dealt with as a unit, and this configuration (so-called sector configuration) is suitable for a memory for the use in a computing device which frequently transfers information to and from the memory. In other words, with this configuration, timings for detecting address signals can be accurately taken, and the address signals are detected without failure during an access operation to another track, thereby ensuring speedy access. Note that the number of the regions 26 may be determined so as to match the purpose.

Figure 10:
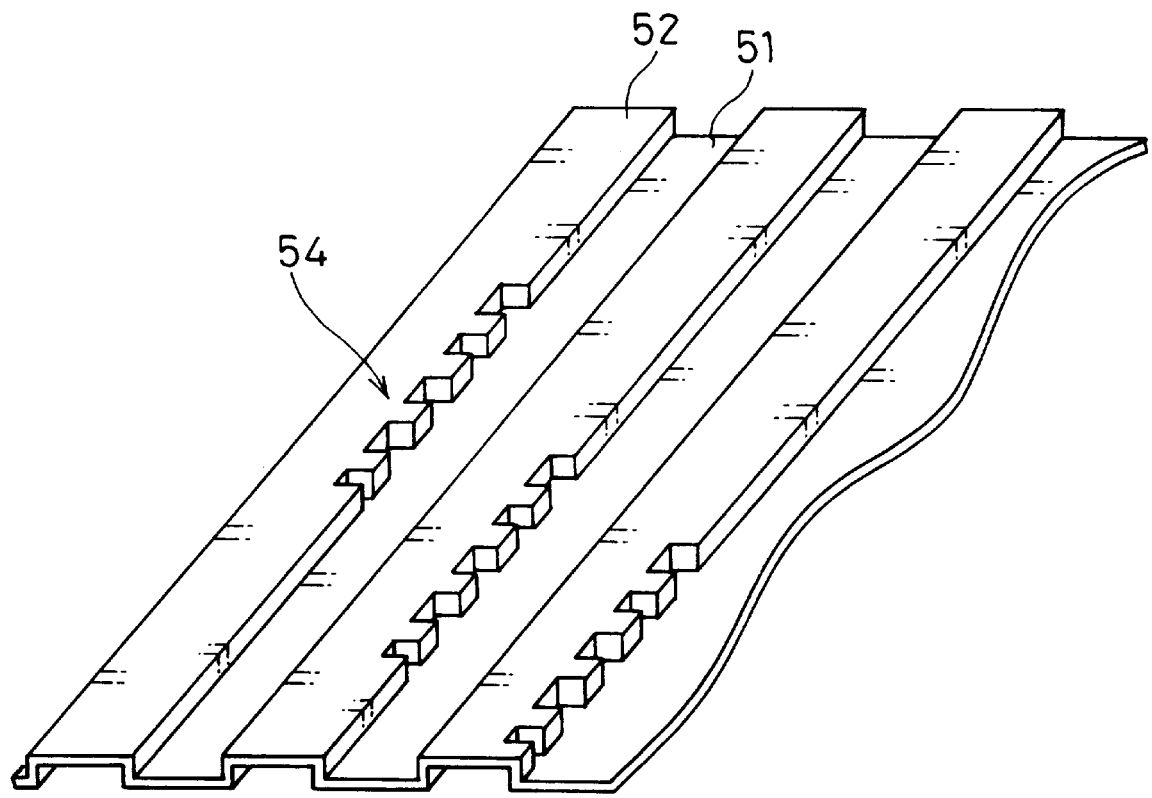
FIG. 10 is a perspective view illustrating another arrangement of the address recording sections.

The above description explains an example wherein the address recording sections 24 are linearly provided in the radial direction of the optical disk 1 as illustrated in FIG. 3, thereby forming the regions 26, but address recording sections 54 may be provided in different directions from the center of the optical disk, as illustrated in FIG. 10. In other words, the address recording sections 54, in each of which wobble is formed on one of side walls of a groove 51 (which is one of side walls of a land 52), are not linearly provided in any radial direction of the optical disk.

This configuration is applicable to a format such as CLV (constant line velocity), ZCAV (zoned constant angular velocity), and ZCLV (zoned constant line velocity). In other words, this configuration is applicable to a format wherein the address recording sections are not disposed on a line in a radial direction. Therefore, the address recording sections can be disposed in accordance with a line velocity, and it is possible to make the recording density substantially constant from the innermost track to the outermost track. As a result, it is possible to extend the recording capacity of the optical disk.

Figure 5:
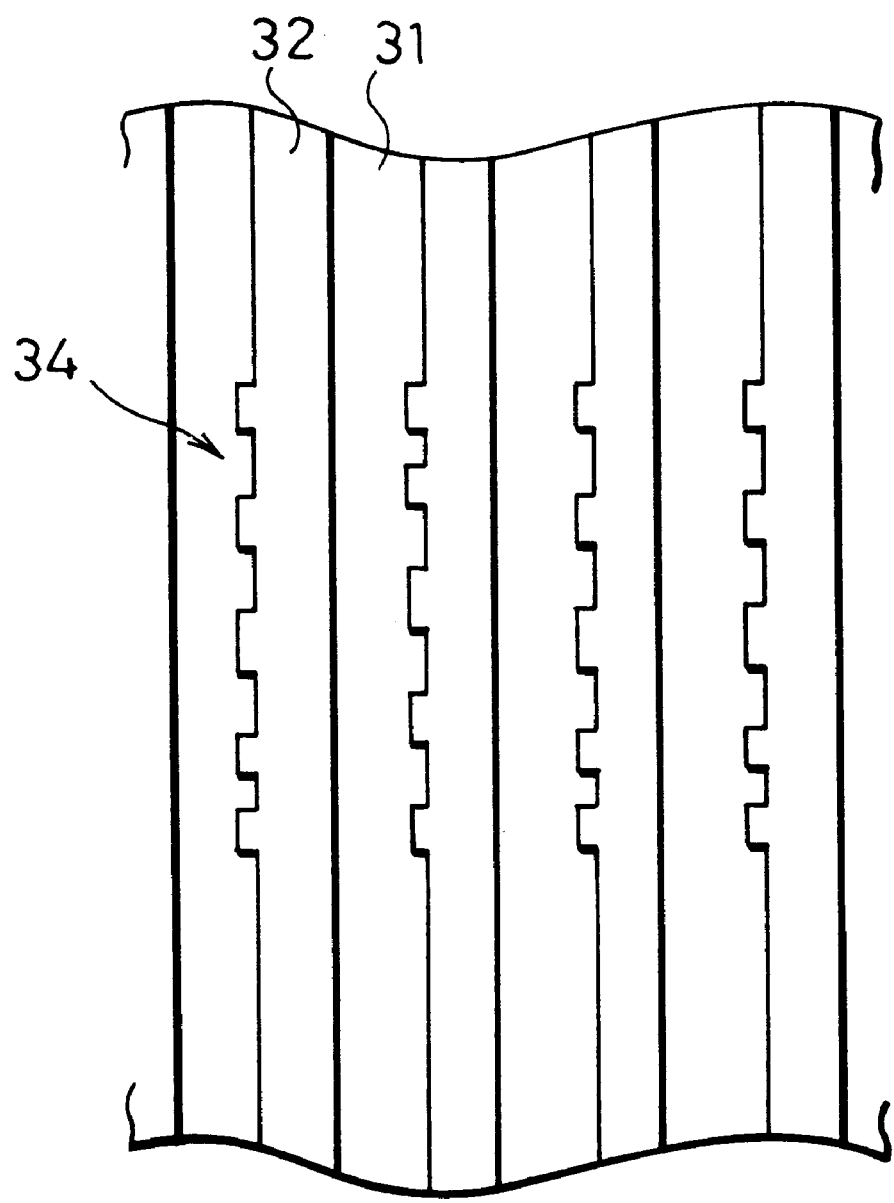
FIG. 5 is a plan view illustrating another example of the shape of the address recording sections.

In the above description, referring to FIG. 4, the case wherein the address signals are recorded by changing the width of the grooves 21 so that the grooves 21 are widened in the address recording sections 24 is taken as an example. But the grooves 21 may be narrowed in the address recording sections 24 so that the address signals are recorded thereon. In other words, in a configuration wherein grooves 31 and lands 32 are provided, the lands 32 are widened in address recording sections 34, as illustrated in FIG. 5.

Figure 6:
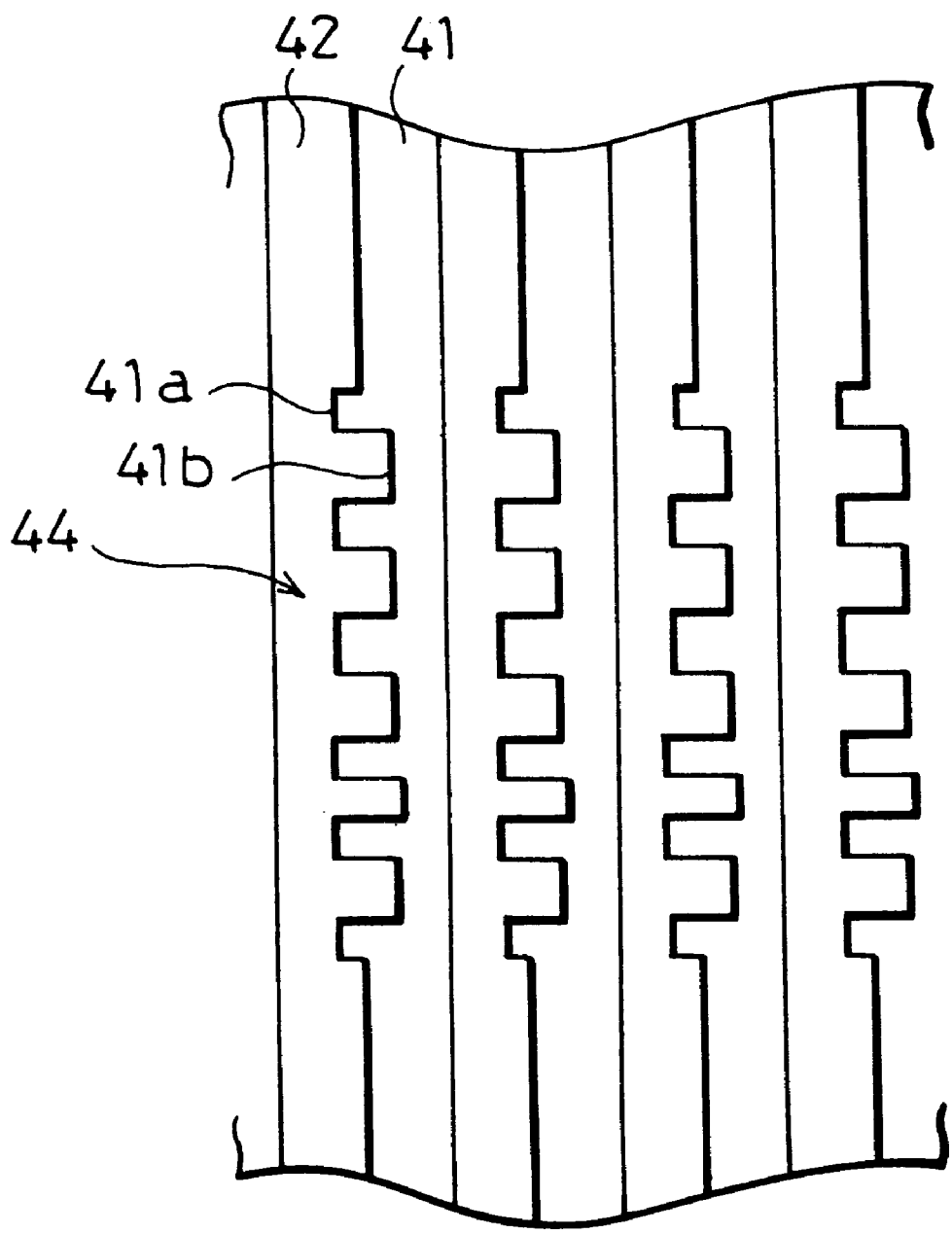
FIG. 6 is a plan view illustrating still another example of the shape of the address recording sections.
Figure 7:
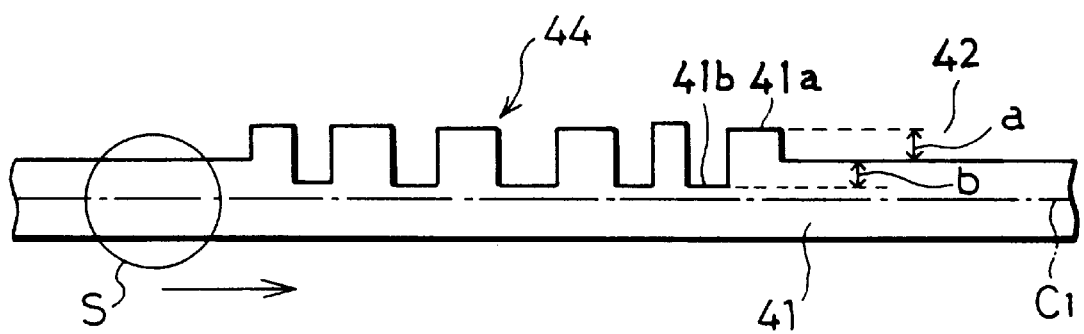
FIG. 7 is a view illustrating how a tracking operation is performed with respect to the address recording section shown in FIG. 6.

Alternatively, as illustrated in FIG. 6, in an optical disk wherein grooves 41 and lands 42 are provided, address recording sections 44 may be arranged so that wobbles extend over both the groove 41 and the land 42. To be more specific, convexes 41a and concaves 41b are provided on one of side walls of the groove 41. Herein, as illustrated in FIG. 7, the groove 41 is widened by a width 'a' so as to form the convex 41a, while the groove 41 is narrowed by a width 'b' so as to form the concave 41b (a width like a width 'a' or 'b' by which the groove (or land) is narrowed or widened so as to form a concave or a convex constituting a wobble is hereinafter referred to as wobble amplitude). Herein needless to say, the optical disk 1 may have the same configuration as that in FIG. 6 except that 41 represents lands while 42 represents grooves in this case.

Figure 8:
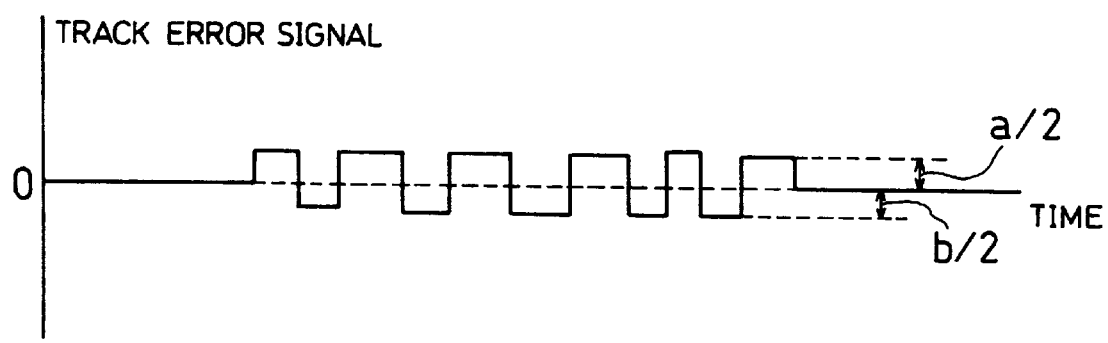
FIG. 8 is a waveform chart of a tracking signal obtained by the tracking operation illustrated in FIG. 7.

Reproduction of signals from the address recording section 44 shown in FIG. 7 is illustrated in FIG. 8.

Assume that the light spot S follows a center line $C_1$ which links points of a width center of the groove 41, relatively proceeding in a direction indicated an arrow in the figure. A tracking signal obtained in this operation is as shown in FIG. 8. To be more specific, since the tracking operation is performed by the tracking servo system, the track error signal becomes virtually zero in regions other than the address recording section 44, while in the address recording section 44 it changes in accordance with changes in the width of the groove 41.

The reason is that since the wobble frequency of the address recording section 44 is set higher than the response frequency of the servo system, the servo system does not respond to the wobble frequency when the address recording section 44 is tracked, thereby resulting in that the track error signal is generated. When tracking the address recording section 44, the light spot S traces not the center line C, but a line which links points at a center of an average width of the address recording section 44.

An amplitude of the track error signal in the address recording section 44, if converted into a track width, is a/2 on one side plus b/2 on the other side. This is because the track width changes by 'a' and 'b', respectively, in FIG. 7, and shifts of the light spot S from the center line in the address recording section 44 are ½ of the changes in the track width.

Besides, the following can be observed: in the case where (1) a DC component of the address signal itself, recorded in the address recording section 44, is zero and (2) as a geometric condition of the address recording section 44, the wobble amplitudes 'a' and 'b' are set so that 'a'='b', an average of the track error signal is zero, no off-set can be caused in the track error signal when the light spot S passes through the address recording section 44.

Thus, by taking out the wobble frequency component out of the tracking signal, it is possible to detect the address signal without affecting the information signal.

Figure 9:
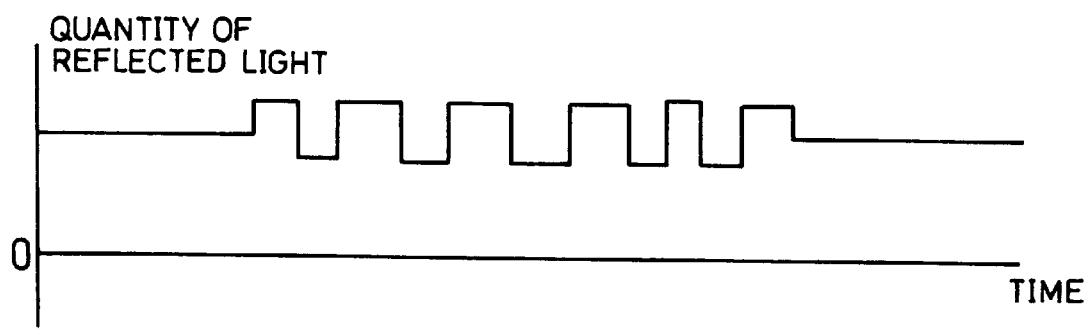
FIG. 9 is a waveform chart illustrating quantities of reflected light obtained from the optical disk by the tracking operations illustrated in FIG. 7.

Note that the optical information recording and reproducing device may have an arrangement wherein changes in quantity of the reflected light detected by photodetector 9 or the photodetectors 13 and 14 is used so as to obtain the address signal. The quantity of reflected light from the address recording section 44 of FIG. 7 is shown in FIG. 9.

Normally, since the quantity of the reflected light decreases as the groove becomes narrower due to the diffraction effect of the groove, the quantity of the reflected light from a narrow portion of the groove is small whereas that from a wide portion of the groove is great. Therefore, the quantity of the reflected light from the address recording section 44 having a wobble with wobble amplitudes of 'a' and 'b' changes as illustrated in FIG. 9. Thus, it is possible to obtain the address signal from the address recording section 44 not by detecting the track error signal but by detecting the quantity of the reflected light.

In this case, there is no need to detect the track error signal at a high speed. Therefore, there is no need to arrange the operational circuit 10 so as to be capable of quick response. The signal frequency band of the servo system normally falls in a range of several tens to several hundreds kHz since it depends on a response speed of an actuator or the like, whereas the information signal frequency band falls in a range of several MHz to several tens MHz, and systems to detect these signals are arranged so as to correspond to the frequency bands. Therefore, in the case where high-speed signal detection is carried out by the use of a detecting system of the servo system, the detecting system comes to have excessive quality of performance. Therefore, in the case where the address signal is obtained by detecting the quantity of the reflected light, only a detector for detecting the total quantity of light (photodetectors 13 and 14 in the case of FIG. 2(*a*)) is required to have an amplifier 16 capable of high-speed detection. As a result, the detecting system is simplified, and hence does not come to have excessive quality.

As described above, the optical disk of the present embodiment is arranged so that each track has one or more address recording sections wherein one of side walls of the groove or the land is dispersively wobbled. Herein, in the case where it is arranged so that information signals are not to be recorded in the address recording sections, it is possible to make a wobble amplitude of the wobbled side wall of the address recording section considerably greater than any conventional wobble amplitude. The reason is as follows: since influences of the wobble signal on the information signal can be neglected in the case where information is not to be recorded in the address recording section, the wobble amplitude of the side wall is allowed to be great so that a wobble signal clear enough can be obtained.

For example, in a conventional optical disk wherein grooves are meandered, it is necessary that the wobble amplitude is not more than about 50 nm (about 5 to 6 percent of the groove width in the case where the groove is 0.8 μm wide), but in the present embodiment there is no need to suppress the wobble to such a degree. As illustrated in FIG. 7, the wobble amplitude may be increased up to about 50 percent of the groove width (for example, up to about 0.4 μm in the case where the groove is 0.8 μm wide). The same is applicable to the address recording sections arranged as shown in FIG. 4 or FIG. 5.

In short, in the case where the wobble amplitude is about 5 to 50 percent of the groove width, it is possible to detect the wobble signal without affecting the information signals. By thus increasing the wobble amplitude, the liability of signals is enhanced, while an error rate in reproduction of address signals is lowered.

An arrangement in the other way around is also applicable, that is, the wobble amplitudes in the address recording sections may be decreased so that information signals may be recorded in the address recording sections. In this case, the recording capacity is extended since the address recording sections are also used as information recording sections.

In the description of the present embodiment, an example wherein information is recorded on both the grooves and lands is described, but information may be recorded either on the grooves or on the lands. However, as described above, it is preferable that both the grooves and lands are used for recording information so as to achieve a greater recording capacity.

The following description will explain a method for manufacturing an optical disk substrate in accordance with the present embodiment.

First, by projecting a light beam on an original disk (substrate) on which a photoresist (photosensitive substance) has been provided, desired patterns of grooves, lands, pits, and the like, are recorded in the photoresist. By developing the patterns, removing unnecessary portions of the photoresist, and plating the photoresist with metal such as nickel, the patterns recorded in the photoresist are transferred on the plating film.

The plating film is removed from the original disk, so as to be made into a stamper. By molding plastic by the use of the stamper as a mold, an optical disk substrate having desired patterns such as grooves, lands, pits, and the like, is manufactured. A recording medium layer is formed on the substrate, and the optical disk described above is completed.

Figure 11:
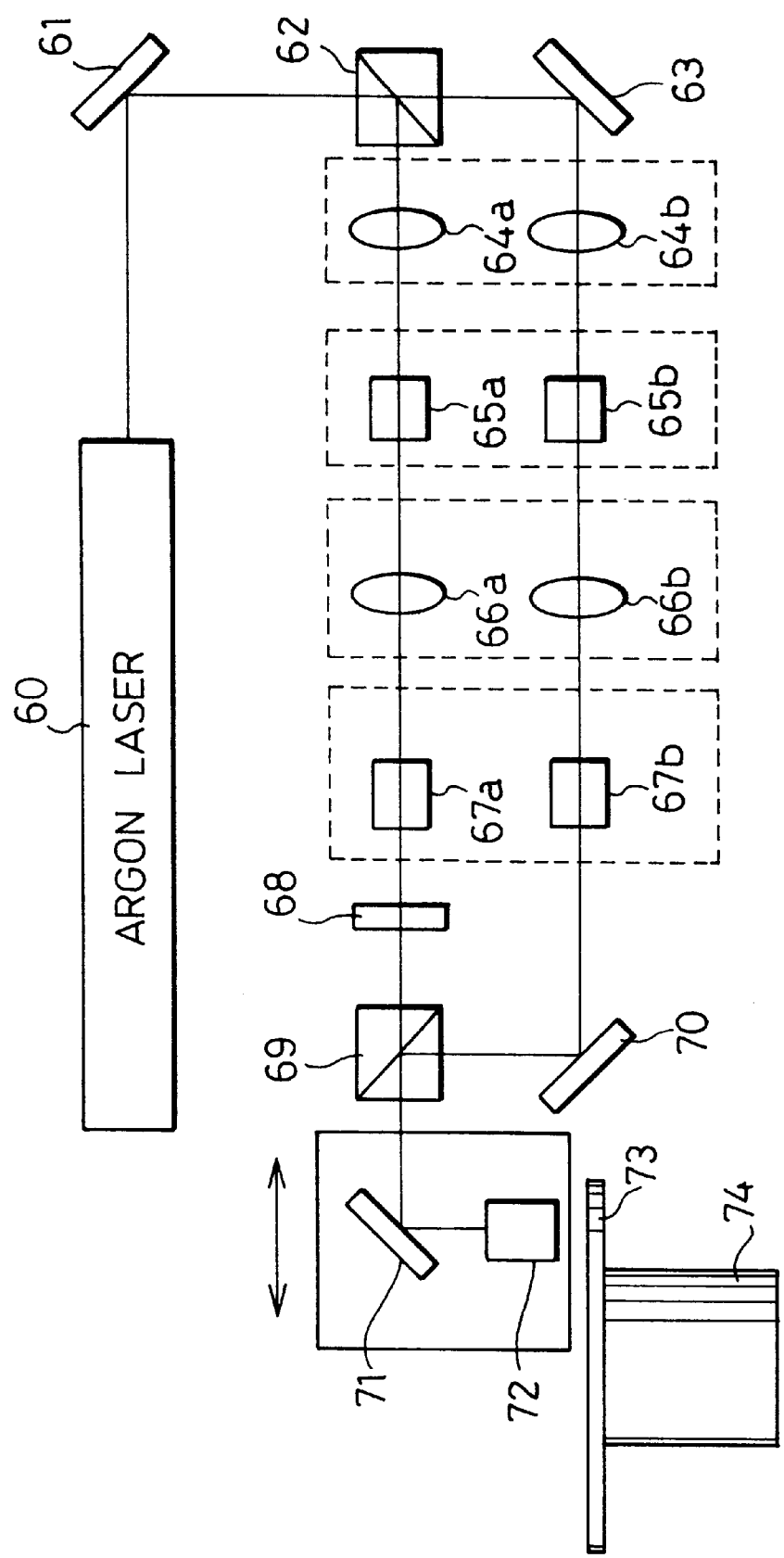
FIG. 11 is a view illustrating an arrangement of a recording device used in a step of exposing a photoresist.

FIG. 11 shows an example of a recording device for recording the desired patterns in the photoresist.

The recording device has an argon laser 60 with which the photoresist on the original disk 73 to light is exposed. The light beam of the argon laser 60 is reflected by a mirror 61, and enters the beam splitter 62. The light beam is divided by the beam splitter 62 into two light beams, and one of them is guided to a light modulator 65*a* through a convex lens 64*a* for conversion. The light beam proceeds to a light deflector 67*a* via the light modulator 65 and a convex lens 66*a*, and a plane of polarization of the light beam is revolved through an angle of 90° by a ½ retardation plate 68. Thereafter the light beam enters a polarizing beam splitter 69.

On the other hand, the other one of the two light beams obtained as a result of division by the beam splitter 62 proceeds to the polarizing beam splitter 69 via a mirror 63, a convex lens 64*b*, a light modulator 65*b*, a convex lens 66*b*, a light deflector 67*b*, and a mirror 70. The two light beams are synthesized by the polarizing beam splitter 69.

The two light beams are guided to an objective lens 72 via a mirror 71, and are projected on a surface of the original disk 73 on which the photoresist is provided. The original disk 73 is turned around by a spindle 74, while the objective lens 72 is driven in a radial direction (indicated by an arrow in the figure) of the original disk 73. As a result, tracks are recorded thereon in a spiral or concentric form.

Here, since the light beam is divided into two and thereafter the two light beams are synthesized and enter the objective lens 72, two light spots are formed on the original disk 73. Besides, since the light modulators 65*a* and 65*b* and the light deflectors 67*a* and 67*b* are respectively provided on optical paths of the two light beams, modulation and deflection can be carried out with respect to the respective light beams.

Figure 12:
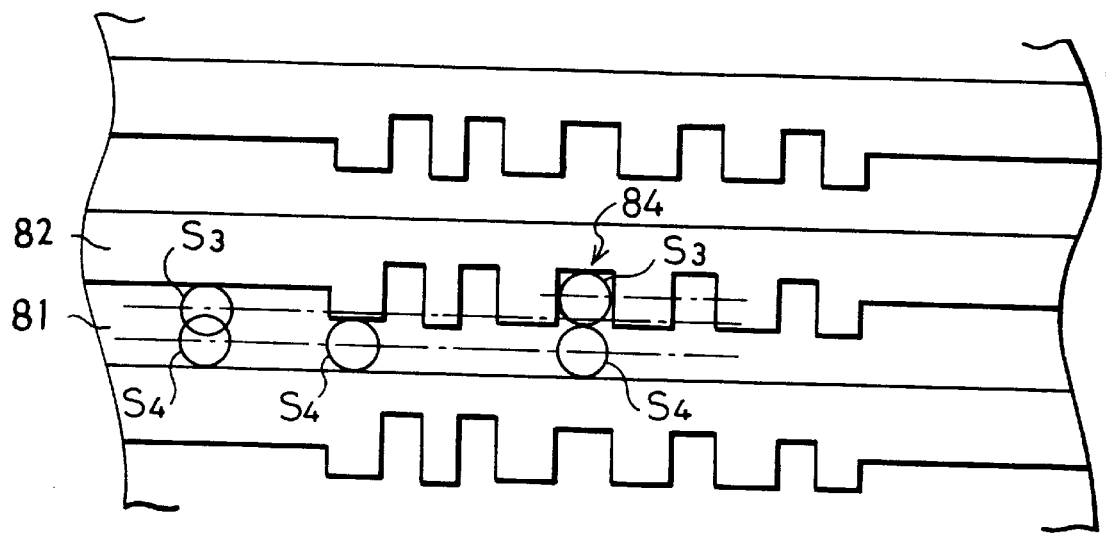
FIG. 12 is an explanatory view showing a method for forming the address recording sections by the use of the recording device.
Figure 13:
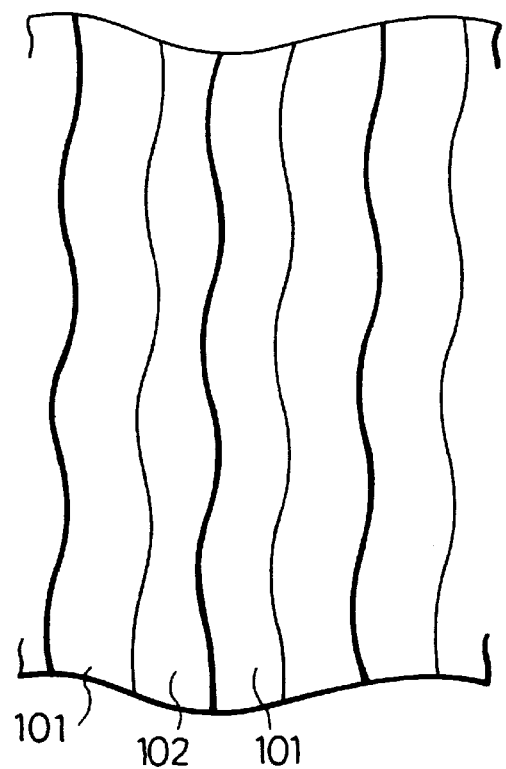
FIG. 13 is a plan view illustrating grooves in a conventional optical disk, both side walls of each groove being wobbled.
Figure 14:
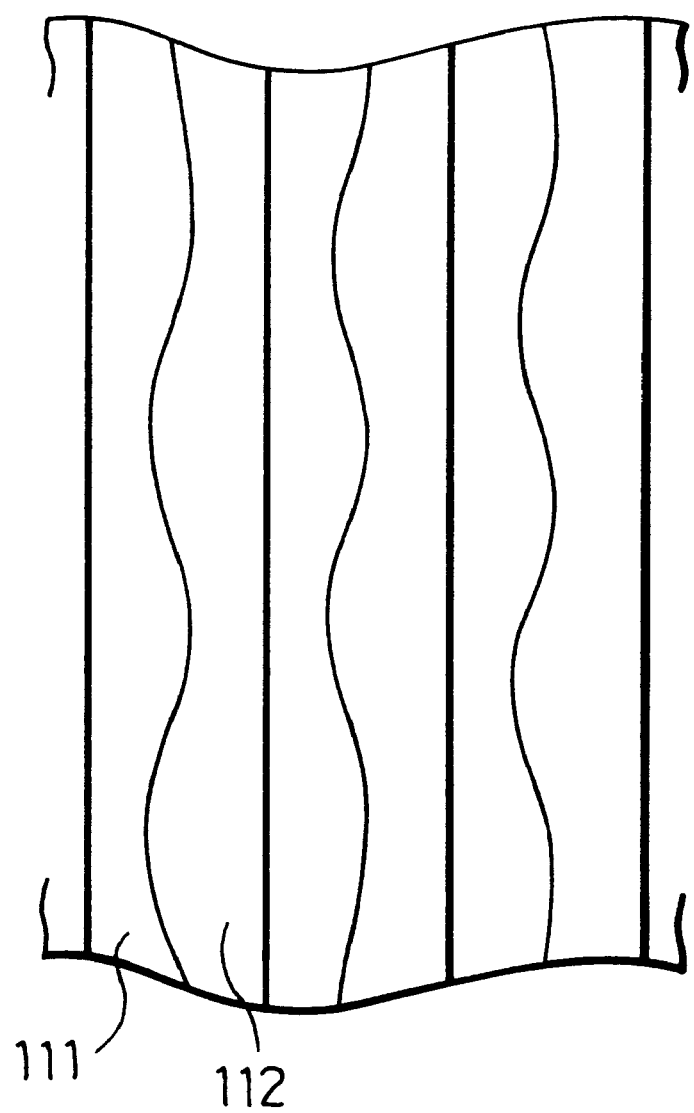
FIG. 14 is a plan view illustrating grooves in another conventional optical disk, one of side walls of each groove being wobbled.
Figure 15:
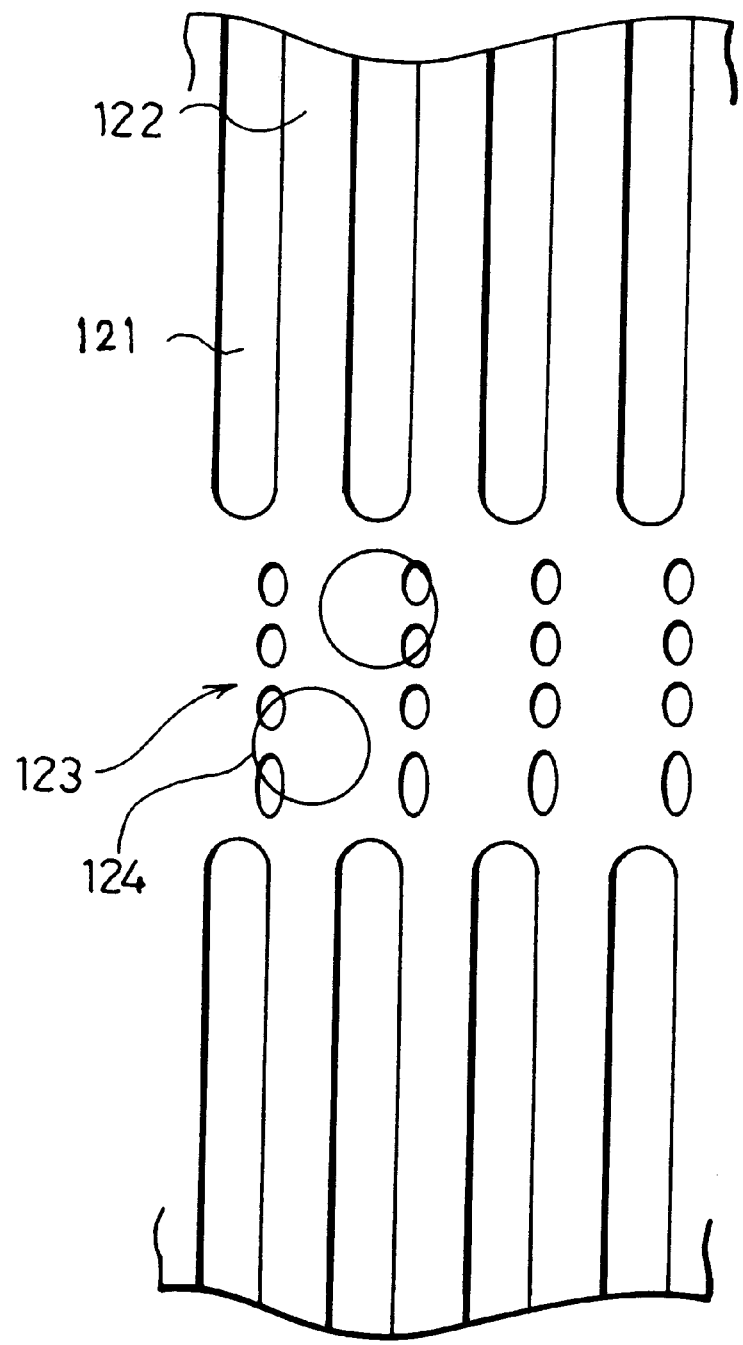
FIG. 15 is a plan view illustrating how a common address method is applied with respect to a conventional optical disk.

Referring to FIG. 12, a method for recording patterns on the original disk 73 will be described below.

When grooves 81 are to be recorded, two light spots $S_3$ and $S_4$ are arranged so as to be lined in a direction orthogonal to a lengthwise direction of the tracks (i.e., in the radial direction of the original disk 73) so that a desired groove width is obtained. To record an address recording section 84, the following steps are carried out. To record a narrow portion of the groove 81, only the spot $S_4$ is used. On the other hand, to record a wide portion of the groove 81, both the light spots $S_3$ and $S_4$ are used, with the light spot $S_3$ shifted in a radial direction of the original disk 73. This set of steps is repeated in accordance with an address signal, and as a result the address recording section 84 is formed.

It is possible to shift the light spot $S_3$ in the radial direction by the use of the light deflector 67*a* (or the light deflector 67*b*) shown in FIG. 11. By this method, the shape of the side wall of either the groove 81 or the land 82 in the address recording section 84 is freely controlled. In other words, by changing an amount of the shift of the light spot in the radial direction of the original disk 73, the wobble amplitudes in the address recording section 84 are freely controlled.

Second Embodiment

The following description will explain an embodiment of an optical disk substrate of the present invention, while referring to FIGS. 16 through 20.

Figure 16:
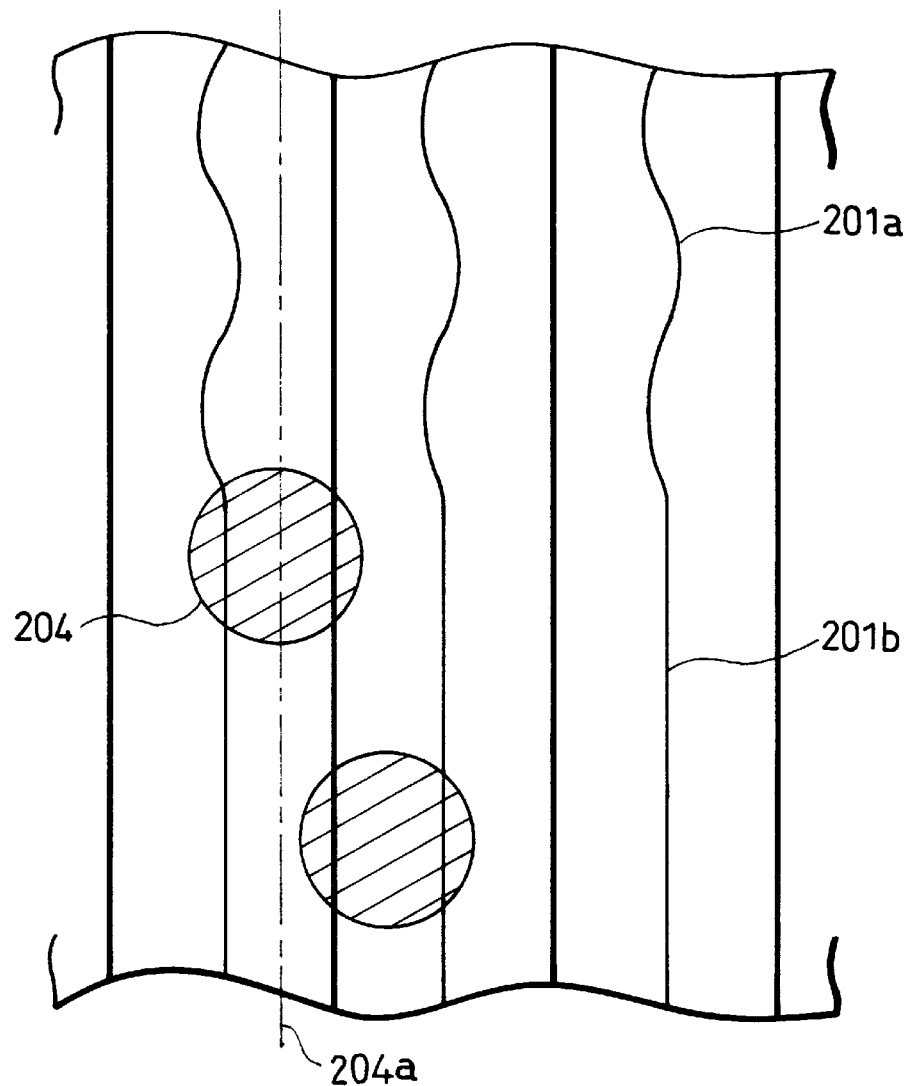
FIG. 16 is a plan view illustrating an arrangement of an optical disk substrate in accordance with any one of second through sixth embodiments of the present invention.
Figure 17:
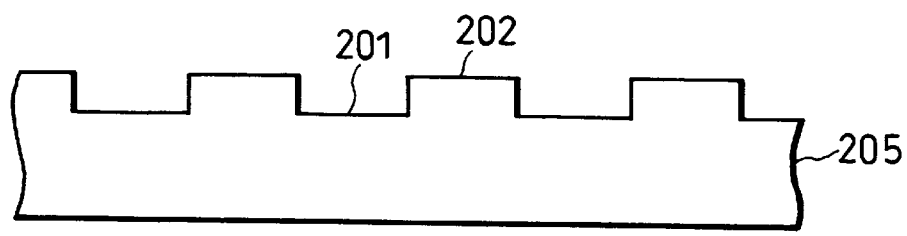
FIG. 17 is a cross section of the optical disk substrate.

On an optical disk substrate 205 used in the present embodiment, there are provided a region (wobble section) wherein one wobbled side wall 201*a* is provided as one of side walls of each tracking-use groove 201 and a region 201*b* wherein non-wobbled side wall is provided as one of side walls of each tracking-use groove 201, as illustrated by a plan view of FIG. 16 and a radial-direction cross-section of FIG. 17. The grooves 201 are formed in a spiral form or in a concentric form. Each area between the grooves 201 is called a land 202, and a width of the land 202 is set substantially equal to the width of the groove 201.

The side walls 201*a* are wobbled in a radial direction of the optical disk substrate 205 and the optical disk in accordance with address information, and a wobble frequency thereof is set higher than a follow-up frequencies of a tracking servo system, and lower than a recording frequency.

A track which a recording/reproduction-use light spot 204 is made to follow is easily switched from the groove 201 to the land 202 or vice versa, only by inverting a polarity of a tracking signal. The tracking signal is obtained by, for example, the push-pull method. The address information is obtained by extracting components of the wobble frequency of the side wall 201*a* from a tracking signal.

To be more specific, when the light spot 204 is made to follow, for example, the groove 201, the light spot 204 actually follows a center line 204*a* running on a substantial center of an average width of the groove 201, since the wobble frequency is higher than the follow-up frequency of the tracking system. For this reason, there always occurs a tracking error corresponding to a half of a wobble amplitude of the groove 201. Therefore, by extracting the tracking error from the tracking signal, signal components of the wobble frequency can be obtained. This also applies to the case where the light spot 204 is made to follow the land 202. It should be noted that information recorded thereon and the address information can be separated since the wobble frequency is set lower than the recording frequencies, as described above.

Since the tracking error is half of the wobble amplitude, it is necessary to double the wobble amplitude in order to obtain the same signal components as those in the case where both the side walls of the groove 201 are wobbled. However, in the case where the width of the groove 201 and the width of the land 202 are 0.8 µm and 0.8 µm, respectively, a signal obtained is 1.4 times as large as that in the cases where the widths are 1.2 µm and 0.4 µm, 1.8 times as large as that in the case where the widths are 1.3 µm and 0.3 µm, and 1.2 times as large as that in the case where the widths are 1.1 µm and 0.5 µm. Therefore, the wobble amplitude may be actually set about 1.4 (=2/1.4) times, 1.1 (=2/1.8) times, and 1.2 (=2/1.2) times, respectively.

Therefore, if the wobble amplitude in the case where both the side walls are wobbled is ±30 nm, the wobble amplitude in the case where the one side wall is wobbled may be set in a range of ±35 nm to ±50 nm.

In the case where the optical disk substrate 205 of the present embodiment is used, the light spot 204, if having a diameter set larger than a track pitch and less than twice the track pitch, does not irradiate two wobbled side walls 201*a* at a time. As a result accurate address information is obtained.

Address information of the groove 201 coincides with address information of an adjacent land 202 sharing the wobbled side wall 201*a* with the groove 201. However, designation of a track, either the groove 201 or the land 202, is carried out just by inverting the polarity of the tracking signal. Therefore, selection of a specific track can be carried out without difficulty.

In the aforementioned present embodiment, the wobble frequency components are extracted from the tracking signal, but signal components of the wobble frequency may be extracted from changes in a quantity of reflected light from the optical disk. To be more specific, reflected light from a portion where the groove 201 or the land 202 is narrow is weak, whereas reflected light from a portion where the groove 201 or the land 202 is wide is strong. Therefore, by extracting changes in the quantity of the reflected light of the recording/reproduction-use light spot 204, the signal components of the wobble frequency can be obtained.

Figure 18:
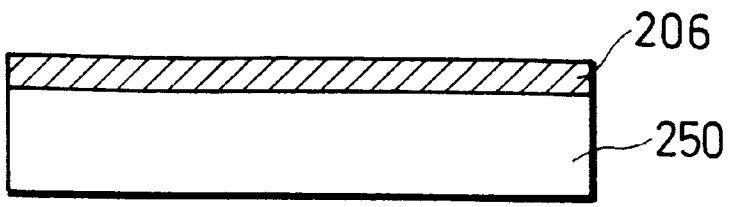
FIGS. 18(a) through 18(e) are cross sections illustrating steps of a manufacturing process of the optical disk substrate.
Figure 18:
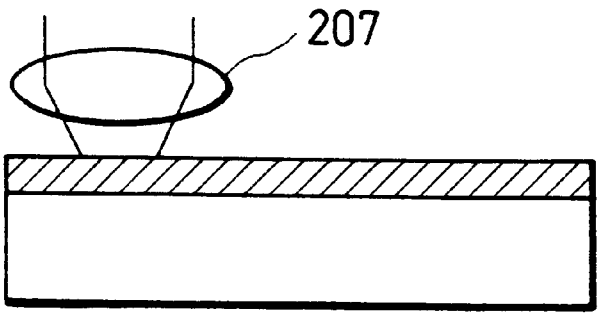
Figure 18:
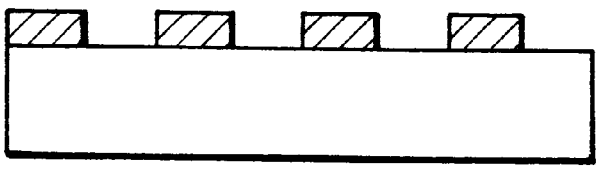
Figure 18:
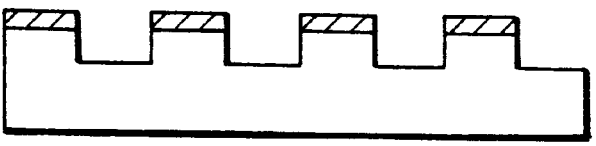
Figure 18:
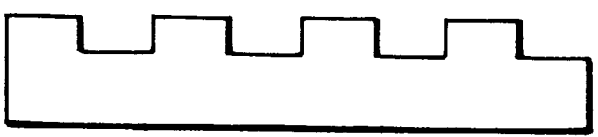

Next, referring to FIGS. 18(*a*) through 18(*e*), the following description will discuss a manufacturing process of the optical disk substrate 205.

First, as illustrated in FIG. 18(*a*), photoresist 206 is applied to one side of a glass substrate 250.

Next, as illustrated in FIG. 18(*b*), a laser beam is converged by an objective lens 207 onto the photoresist 206 so that the photoresist 206 is exposed so as to form desired patterns of grooves 201.

As illustrated in FIG. 18(*c*), the exposed photoresist 206 is developed and removed, and subsequently, the desired patterns are formed by the residual photoresist 206.

As illustrated in FIG. 18(*d*), the glass substrate 250 and the photoresist 206 are etched by a dry etching or wet etching process so that the desired patterns are formed in the glass substrate 250.

As illustrated in FIG. 18(*e*), the residual photoresist 206 is removed by an ashing process so that the optical disk substrate 205 is complete.

Figure 19:
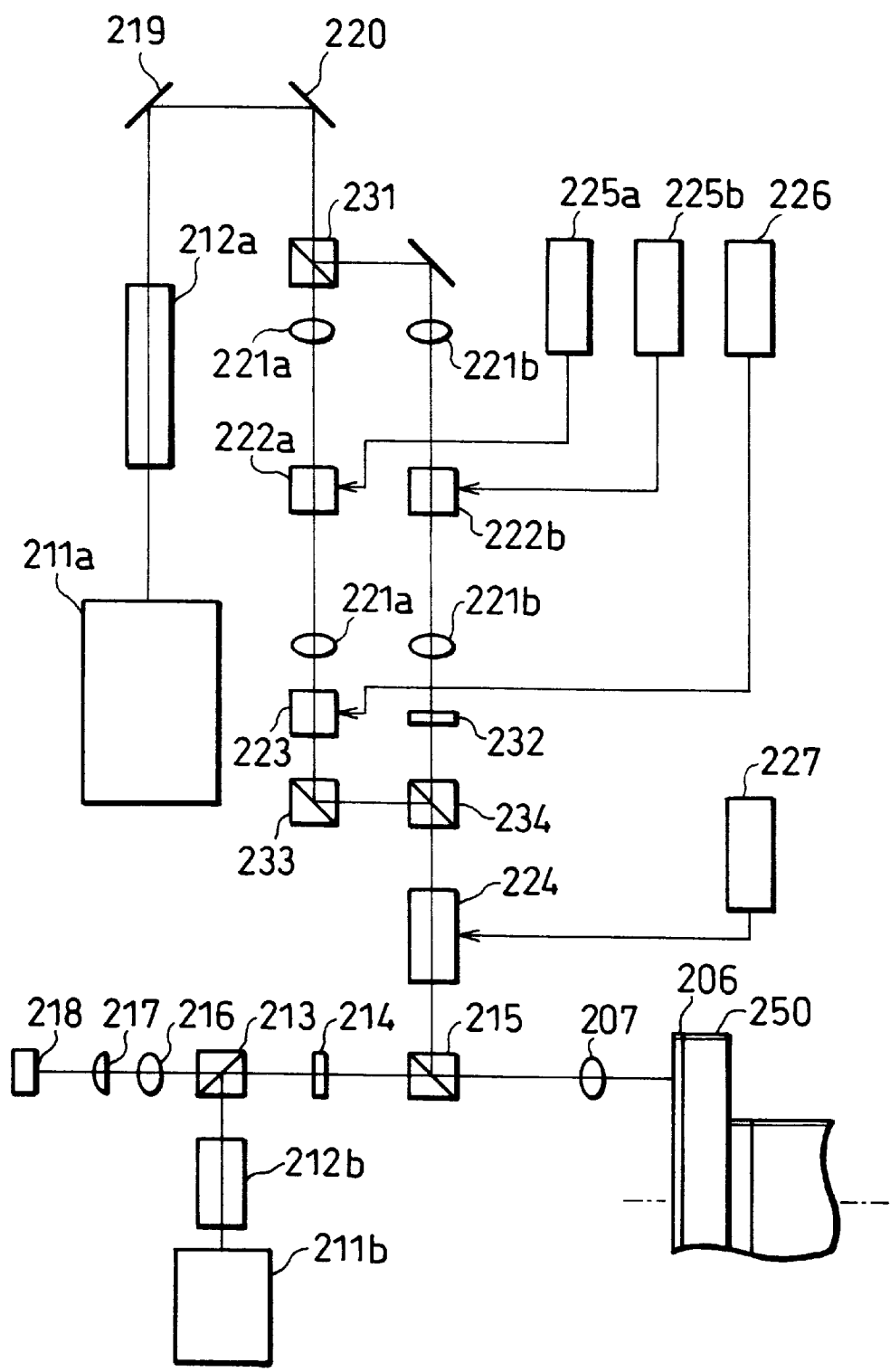
FIG. 19 is a view illustrating an arrangement of a manufacturing device of the optical disk substrate.

FIG. 19 illustrates a device for exposing the photoresist 206 in a pattern of the groove 201.

The device has a laser beam source 211*a* for exposing the photoresist 206 and a laser beam source 211*b* used for focalizing the objective lens 207. For example, an Ar laser is used as the laser beam source 211*a*, while an He-Ne laser is used as the laser beam source 211*b*.

A laser beam from the laser beam source 211*a* is processed by a noise suppressing device 212*a* so that optical noises are reduced, and thereafter, the light is reflected by mirrors 219 and 220 and is divided into two by a beam splitter 231. The two light fluxes thus obtained enter light modulators 222a and 222b. As the light modulators 222a and 222b, acoustooptic elements, for example, may be used. In this case, a pair of converging lenses 221a and a pair of converging lenses 221b are provided before and behind the light modulators 222a and 222b, respectively.

The laser beam having passed through the light modulator 222a enters a light deflector 223, and thereafter, it is reflected by a prism mirror 233 in a right angle direction. As the light deflector 223, an electro-optical element, or an acoustooptic element, for example, is used, so as to change a proceeding direction of the laser beam. On the other hand, the laser beam having passed through the light modulator 222b enters a (½) retardation plate 232, where a plane of polarization of the laser beam is revolved through an angle of 90°.

Thereafter, the laser beam is expanded by a beam expander 224 so as to have an appropriate beam diameter, and then, a two-color mirror 215 makes the laser beam enter the objective lens 207. The objective lens 207 converges the laser beam so that the laser beam forms an exposure-use light spot on the photoresist 206 on the glass substrate 250.

Note that the light modulators 222a and 222b, the light deflectors 223, and the beam expander 224 are controlled by drivers 225a, 225b, 226, and 227, respectively.

On the other hand, the laser beam from the laser beam source 211b is processed by the noise suppressing device 212b so that optical noises are reduced, then proceeds to the objective lens 207 via a light deflecting beam splitter 213, a (¼) retardation plate 214, and the two-color mirror 215. By the objective lens 207, the laser beam is converged on the photoresist 206 on the glass substrate 250.

Reflected light therefrom is again converged by the objective lens 207, passes through the two-color mirror 215, the (¼) retardation plate 214, and the light deflecting beam splitter 213, and then, it is converged by an objective lens 216 and a cylindrical lens 217 on a photodetector 218. In response to signals from the photodetector 218, the focus servo system drives the objective lens 207 in a focus direction, whereby the objective lens 207 is focalized at the photoresist 206 on the glass substrate 250 which is rotated by a spindle motor.

In the above-described arrangement, positioning of the light beam spot is carried out. To be more specific, a DC voltage applied to the light deflector 223 and a setting angle of the prism mirror 233 are adjusted by the driver 226 so that a two light spots are formed with a predetermined average distance therebetween in the radial direction. Thereafter, only in regions where one of the side walls of the groove should be wobbled in accordance with address information, a voltage resulting on superimposing a signal voltage of the wobble frequency on the aforementioned DC voltage is applied to the light deflector 223 by the driver 226. By doing so, regions where only one side wall of the groove is wobbled in accordance with address information are formed.

Note that the light spots are turned on and off by applying voltages to the light modulators 222a and 222b by the drivers 225a and 225b, respectively.

The optical disk substrate 205 of the present embodiment is not limited to the aforementioned one. Instead of this, any one made by plastic resin through the injection molding or the injection pressure molding by the use of a stamper manufactured through steps illustrated in FIGS. 20(a) through 20(f) may be used.

Figure 20A:
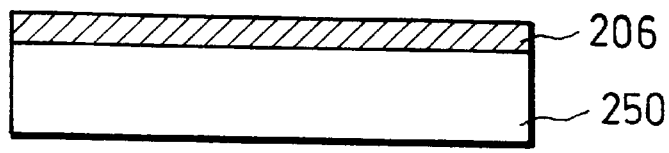
FIGS. 20(a) through 20(f) are cross sections illustrating steps of another manufacturing process of the optical disk substrate.

As illustrated in FIG. 20(a), photoresist 206 is applied to one surface of a glass substrate 250.

Figure 20B:
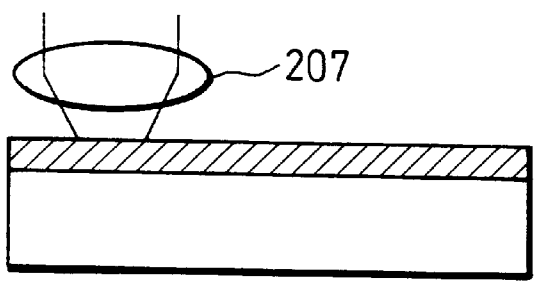
Figure 20C:
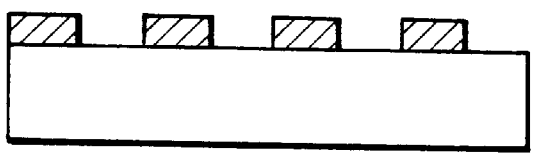

Next, as illustrated in FIG. 20(b), a laser beam is converged by an objective lens 207 onto the photoresist 206 so that the photoresist 206 is exposed so as to form desired patterns of the grooves 201.

As illustrated in FIG. 20 (c), the exposed photoresist 206 is developed and removed, and as a result, the desired patterns are formed by the residual photoresist 206.

Figure 20D:
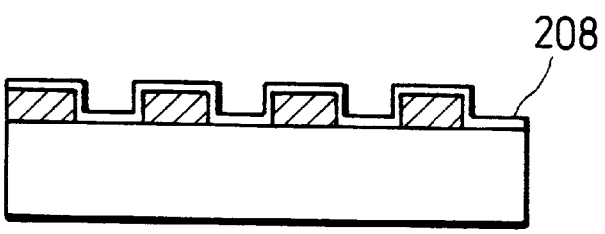

Thereafter, as shown in FIG. 20(d), a conductive thin film 208 is formed on the patterns made of the photoresist 206 by sputtering, electroless plating or other methods.

Figure 20E:
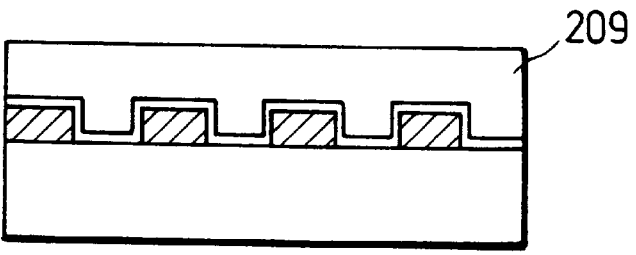

Then, as illustrated in FIG. 20(e), a metal layer 209 is formed on the thin-film 208 by electrocasting or other methods.

Figure 20F:
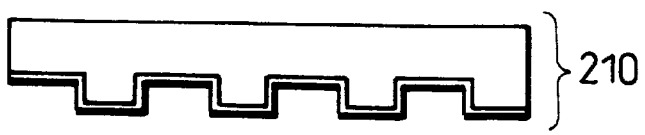

Finally, as shown in FIG. 20(f), the thin-film 208 and the metal layer 209 are separated from the photoresist 206 and the glass substrate 250. The thin-film 208 and the metal layer 209 thus separated therefrom are called a stamper 210.

Here, Ni, Ta, Cr or an alloy of these materials is used as the material of the thin-film 208, or a composite film of these materials is applied, and Ni, Ta, Cr or an alloy of these materials is also used as the material of the metal layer 209, or a composite film of these materials is applied.

By using the above-mentioned stamper 210, an optical disk substrate 205, made of plastic, is manufactured through injection molding or injection pressure molding. Thermoplastic resins, such as polycarbonate resin, acryl resin, ethylene resin, ester resin, nylon resin, or APO, are used as the plastic material.

A method for manufacturing the stamper 210 of the present embodiment is not limited to the aforementioned method, but another method using a mask original disk produced so that one side wall 201a is wobbled in each groove may be used.

In addition, materials of the optical disk substrate 205 and a method for manufacturing the optical disk substrate 205 are not limited to those mentioned above.

Note that in the above description the address information is obtained by extracting the signal components of the wobble frequency of the side wall, but the address information may be obtained by reading shapes and number of wobbles. By doing so, there is no need to change the wobble frequency in the manufacturing process, thereby resulting in simplification of the control system.

As has been described, in the case of the present embodiment, even if the beam spot has an offset in a first region where one side wall 201a is wobbled as illustrated in FIG. 16, it is possible to correct the offset in a second region where no side wall is wobbled.

Besides, since wobbles are shaped with curves, in the case where the optical disk is produced with the use of resin, mold flow into the mold is enhanced, thereby improving moldability.

Furthermore, since the wobbles are shaped with curves, high frequency noises are hardly generated when address information is read out from the regions of the wobbles (the first regions). As a result, the address information is read out with precision. This is very important especially in the case where address information is recorded only in specific portions, as the present application.

Third Embodiment

The following description will explain still another embodiment of an optical disk substrate of the present invention, while referring to FIG. 17.

As to an optical disk substrate 205 of the present embodiment, characteristics, substrate materials, and a manufacturing process thereof are the same as those for the optical disk substrate 205 of the second embodiment, whereas a groove depth (land height) thereof is different.

The groove depth (land height) of the optical disk substrate 205 is in the vicinity of $\lambda/6n$ (index of refraction of the substrate: n, recording wavelength: $\lambda$). The groove depth (land height) is changed by changing an etching ratio, changing etching conditions, setting a groove depth (land height) of the stamper 210 in the vicinity of $\lambda/6n$, or changing molding conditions.

In the case where the groove depth (land height) of the optical disk substrate 205 is $\lambda/6n$, crosstalk between tracks (mixture of noises from track signals of adjusting tracks) is reduced, thereby resulting in that high densification is enabled.

Fourth Embodiment

The following description will explain still another embodiment of an optical disk substrate of the present invention, while referring to FIG. 17.

As to an optical disk substrate 205 of the present embodiment, characteristics, substrate materials, and a manufacturing process thereof are the same as those for the optical disk substrate 205 of the second embodiment, whereas a groove depth (land height) thereof is different.

The groove depth (land height) of the optical disk substrate 205 is in the vicinity of $\lambda/8n$ (index of refraction of the substrate: n, recording wavelength: $\lambda$). The groove depth (land height) is changed by changing an etching ratio, changing etching conditions, setting a groove depth (land height) of the stamper 210 in the vicinity of $\lambda/8n$, or changing molding conditions.

In the case where the groove depth (land height) of the optical disk substrate 205 is in the vicinity of $\lambda/8n$, the tracking signal is maximized, thereby causing track following operations to be stabilized.

Fifth Embodiment

The following description will explain still another embodiment of an optical disk substrate of the present invention, while referring to FIG. 17.

As to an optical disk substrate 205 of the present embodiment, characteristics, substrate materials, and a manufacturing process thereof are the same as those for the optical disk substrate 205 of the first embodiment, whereas a groove depth (land height) thereof is different.

The groove depth (land height) of the optical disk substrate 205 is in the vicinity of $\lambda/10n$ (index of refraction of the substrate: n, recording wavelength: $\lambda$). The groove depth (land height) is changed by changing an etching ratio, changing etching conditions, setting a groove depth (land height) of the stamper 210 in the vicinity of $\lambda/10n$, or changing molding conditions.

In the case where the groove depth (land height) of the optical disk substrate 205 is in the vicinity of $\lambda/10n$, a reproduction signal is made greater, thereby having stable reproduction signal characteristics.

Sixth Embodiment

The following description will explain still another embodiment of an optical disk substrate of the present invention, while referring to FIG. 17.

As to an optical disk substrate 205 of the present embodiment, characteristics, substrate material, and a manufacturing process thereof are the same as those for the optical disk substrate 205 of the first embodiment, whereas a groove depth (land height) thereof is different.

The groove depth (land height) of the optical disk substrate 205 is not less than $\lambda/3n$ (index of refraction of the substrate: n, recording wavelength: $\lambda$). The groove depth (land height) is changed by changing an etching ratio, changing etching conditions, setting a groove depth (land height) of the stamper 210 not less than $\lambda/3n$, or changing molding conditions.

In the case where the groove depth (land height) of the optical disk substrate 20S is not less than $\lambda/3n$, crosserase (erasing information recorded in adjacent tracks by mistake during erasing operations) is avoidable even in the case where an intensity of the light beam is high. As a result, the intensity control of the light beam is made easy, while the erasing operations are stabilized.

Seventh Embodiment

Figure 21:
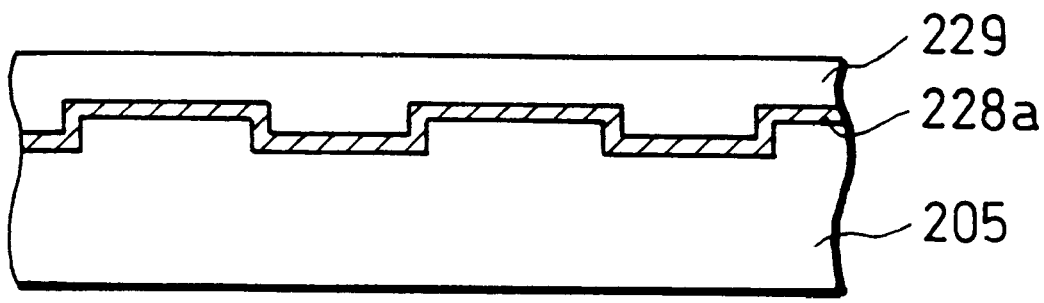
FIG. 21 is a cross section illustrating an arrangement of an optical disk using the optical disk substrate.

The following description will explain an embodiment of an optical disk of the present invention, while referring to FIG. 21.

As illustrated in FIG. 21, the optical disk of the present embodiment has a construction in which a magneto-optical recording layer 228a and an overcoat layer 229 are successively stacked on any one of the optical disk substrates 205 of the second through sixth embodiments. The magneto-optical recording layer 228a, not shown, is constituted by a light-transmitting dielectric layer, a magnetic layer, a protective layer and a reflection layer, and the magnetic layer is made of a rare-earth-metal-transition-metal alloy selected from, for example, DyFeCo, TbFeCo, DyTbFeCo, GdTbFe, GdTbFeCo, etc.

The magnetic layer has the property of exhibiting perpendicular magnetization within the range from room temperature to the Curie Point.

In the above-mentioned arrangement, information recording is carried out in the following processes. First, (1) the temperature of the magnetic layer is raised to the vicinity of the Curie Point by applying a laser beam so that the magnetization of the magnetic layer becomes zero or the magnetization is inverted upon application of recording magnetization, and in this state, the magnetization of the magnetic layer is aligned upward by applying, for example, upward recording magnetization. Thereafter, (2) in the same manner, the temperature of the magnetic layer is raised to the vicinity of the Curie Point by applying a laser beam so that the magnetization of the magnetic layer becomes zero or the magnetization is inverted upon application of recording magnetization, and in this state, the magnetization of the magnetic layer is aligned downward by applying the opposite-direction recording magnetization, that is, downward recording magnetization. Thus, information is recorded.

Here, in actual processes, either of the light-modulation recording method using a modulated laser light beam or the magnetic-field modulation recording method using a modulated recording magnetic field can be adopted.

Consequently, an optical disk (a magneto-optical disk), which enables overwriting operations of not less than 1 million times, can be achieved.

Eighth Embodiment

Figure 22:
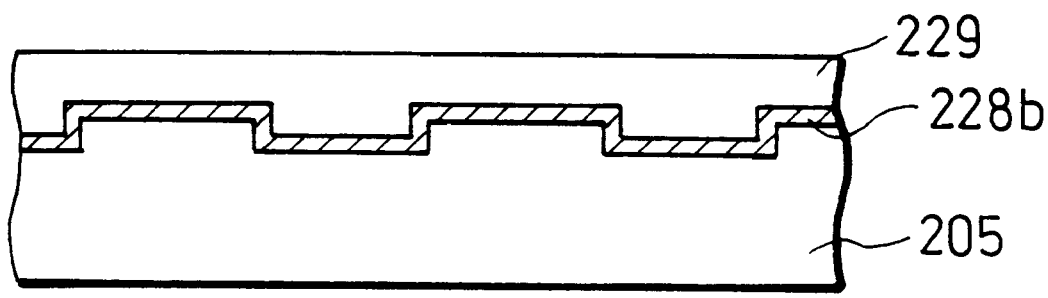
FIG. 22 is a cross section illustrating an arrangement of another optical disk using the optical disk substrate.

The following description will explain another embodiment of an optical disk of the present invention, while referring to FIG. 22.

As illustrated in FIG. 22, the optical disk of the present embodiment has a construction in which a phase-change-type layer 228b and an overcoat layer 229 are successively stacked on any one of the optical disk substrates 205 of the second through sixth embodiments. The phase-change-type recording layer 228b, not shown, is constituted by a light-transmitting dielectric layer, a recording layer, a protective layer and a reflection layer. The recording layer is made of a phase-change-type recording material, such as GeSbTe.

In the above-mentioned arrangement, when recording is carried out, a high-power laser light beam is applied so that the recording layer attains an amorphous state, and then a low-power laser light beam is applied so that the recording layer attains a crystal state; thus, the recording is complete.

Consequently, it is possible to achieve a phase-change-type optical disk which enables an overwriting operation by using only a laser light beam.

Ninth Embodiment

Figure 23:
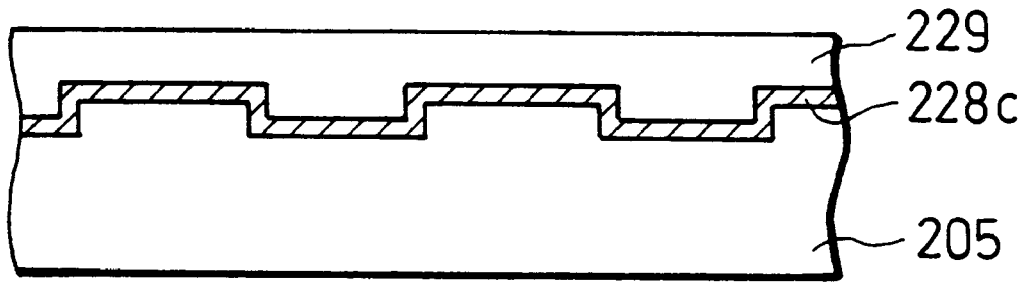
FIG. 23 is a cross section illustrating an arrangement of still another optical disk using the optical disk substrate.

The following description will explain another embodiment of an optical disk of the present invention, while referring to FIG. 23.

As illustrated in FIG. 23, the optical disk of the present embodiment has a construction in which a magneto-optical recording layer 228c and an overcoat layer 229 are successively stacked on any one of the optical disk substrates 205 of the second through sixth embodiments.

The magneto-optical recording layer 228c, not shown, is constituted by a light-transmitting dielectric layer, a reproducing magnetic layer, a recording magnetic layer and a reflection layer, which are stacked in this order. The reproducing magnetic layer is made of a rare-earth-metal-transition-metal alloy selected from, for example, GdFeCo, GdDyFeCo, etc., and the recording magnetic layer is made of a rare-earth-metal-transition-metal alloy selected from, for example, DyFeCo, TbFeCo, DyTbFeCo, GdTbFe, GdTbFeCo, etc.

The reproducing magnetic layer has the property of exhibiting in-plane magnetization within the range from room temperature to a predetermined temperature and of exhibiting perpendicular magnetization above the predetermined temperature, and the recording magnetic layer has the property of exhibiting perpendicular magnetization within the range from room temperature to the Curie Point.

In the above-mentioned arrangement, upon recording, the same processes as described in the seventh embodiment are carried out, and upon reproducing, the following processes are carried out. When a light beam is applied onto the reproducing magnetic layer, the temperature distribution of the irradiated portion has a Gaussian distribution; therefore, only an area smaller than the light-beam diameter has a temperature rise. In accordance with this temperature rise, the magnetization of the temperature-rise portion is shifted from in-plane magnetization to perpendicular magnetization. In other words, the magnetization direction of the recording magnetic layer is copied onto the reproducing magnetic layer due to an exchange coupling between the two layers, that is, the reproducing magnetic layer and the recording magnetic layer. When the temperature-rise portion is shifted from in-plane magnetization to perpendicular magnetization, only the temperature-rise portion comes to exhibit the magneto-optical effect, and information, recorded on the recording magnetic layer, is reproduced in accordance with light beam reflected from the temperature-rise portion.

Thereafter, when the light beam is shifted to reproduce the next recording bit, the temperature of the previously reproduced portion drops so that a transition from perpendicular magnetization to in-plane magnetization takes place. Accordingly, the temperature-drop portion no longer exhibits the magneto-optical effect so that the magnetization, recorded on the recording magnetic layer, is masked by the in-plane magnetization of the reproducing magnetic layer and is no longer reproduced. This makes it possible to eliminate the intervention of signals from adjacent bits that tends to cause noise.

As described above, in the optical disk of the present embodiment, only the area having a temperature not less than the predetermined temperature is subjected to the reproducing operation; thus, it becomes possible to reproduce a recording bit that is smaller than the diameter of a light beam, and consequently to improve the recording density to a great degree.

Note that instead of the foregoing optical disk, an optical disk as follows may be used: a dielectric layer is provided between a reproducing magnetic layer and a recording magnetic layer, and upon reproducing, the reproducing magnetic layer is subjected to the reproducing operation by the use of a leakage magnetic field from the recording magnetic layer.

Tenth Embodiment

The following description will explain an embodiment of an optical recording and reproducing method of an optical disk of the present invention, while referring to FIG. 16.

In any one of the optical disks of the seventh through ninth embodiments, information recording can be carried out with respect to both the first and second regions of the groove 201 and/or land 202, the first regions being regions wherein the wobbled side walls 201a are formed while the second regions being regions wherein the non-wobbled side walls 201b are formed. However, by recording information only in the second regions wherein the non-wobbled side walls 201b are formed, the recording density is lowered, but more significantly, the grooves and/or lands are caused to have uniform widths, respectively, in portions where information is recorded. As a result, the reflectance is made uniform, and information reproduction signals are stabilized.

Furthermore, since it is allowed to raise the wobble frequencies in the first regions to a level as high as the information recording frequencies in the second regions, the size of each first region can be reduced.

Note that a track to which the recording/reproduction-use light spot 204 is made to follow, either a groove 201 or a land 202, is easily designated just by inverting a polarity of the tracking signal.

(1) As has been discussed so far, the optical disk substrate of the present invention on which tracking-use grooves and lands are provided has (i) a first region where one of side walls of each groove or land is curving in accordance with address information, and (ii) a second region where no side wall is wobbled.

With this arrangement, even when the beam spot has an offset in the first region, the offset can be corrected in the second region.

Besides, by recording information only in the second regions, the grooves and the lands in information recording areas are made to have uniform widths, respectively. Therefore, the reflectance is made uniform, thereby stabilizing information reproduction signals. Furthermore, in this case, since the first regions in which the address information is recorded and the second regions in which information is recorded are separately provided, there is no need to set the wobble frequency considerably lower than the recording frequency. Therefore, by raising the wobble frequency of the wobbled side wall in the first region to a level as high as the recording frequency for information in the second region, the size of the first region can be reduced.

In addition, since wobbles are shaped with curves, in the case where the optical disk is produced with the use of resin, mold flow is enhanced, thereby improving moldability.

Furthermore, since the wobbles are shaped with curves, high frequency noises are hardly generated when address information is read out from the regions of the wobbles (the first regions). As a result, the address information is read out with precision. This is very important especially in the case where address information is recorded only in specific portions, as the present application.

(2) It is preferable that the optical disk substrate has a groove depth in the vicinity of $\lambda/6n$, where an index of refraction of the substrate is n while a recording wavelength is $\lambda$.

With this arrangement, crosstalk between tracks (mixture of noises from track signals of adjusting tracks) is reduced, thereby resulting in that high densification is enabled.

(3) It is preferable that the optical disk substrate has a groove depth in the vicinity of $\lambda/8n$, where an index of refraction of the substrate is n while a recording wavelength is $\lambda$.

With this arrangement, the tracking signal is maximized, thereby causing track following operations to be stabilized.

(4) It is preferable that the optical disk substrate has a groove depth in the vicinity of $\lambda/10n$, where an index of refraction of the substrate is n while a recording wavelength is $\lambda$.

With this arrangement, a reproduction signal is made greater, thereby having stable reproduction signal characteristics.

(5) It is preferable that the optical disk substrate has a groove depth of not less than $\lambda/3n$, where an index of refraction of the substrate is n while a recording wavelength is $\lambda$.

With this arrangement, erasing information recorded in adjacent tracks by mistake during erasing operations (crosserase) is avoidable even in the case where an intensity of the light beam is high. As a result, the intensity control of the light beam is made easy.

(6) An optical recording and reproducing method of the present invention, which is a method with respect to an optical recording medium having a plurality of lands and grooves having first regions where only one side wall is wobbled in accordance with address information and second regions where no wide wall is wobbled, is characterized in comprising the step of carrying out at least one among information recording, reproducing, and erasing operations with respect to only second regions.

With this arrangement, the grooves and/or lands are caused to have uniform widths, respectively, in portions where information is recorded. As a result, the reflectance is made uniform, and information reproduction signals are stabilized.

Furthermore, since the first regions where address information is recorded and the second regions where information is recorded are separately provided, there is no need to set the wobble frequency of the wobbled side wall considerably lower than the recording frequency for recording information. Therefore, it is allowed to raise the wobble frequency in the first regions to a level as high as the information recording frequencies in the second regions, and the size of each first region can be reduced.

The present invention should not be limited to the above embodiments which are described using an example wherein an optical disk is used as the optical recording medium, and needless to say, the same effect is achieved in the case where an optical card or an optical tape is used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical information recording and reproducing device for the use with respect to an optical recording medium, said optical recording medium having a plurality of lands and grooves between the lands, each of the lands and the grooves serving as a track on which a light beam is projected for recording, reproducing, and erasing information, wherein each track has at least one wobble section so that address information is recorded therein, the wobble section having a dispersively wobbled side wall of either the groove or the land, said optical information recording and reproducing device comprising:

a photodetector for detecting reflected light obtained by projecting a light beam on said optical recording medium; and an operational unit for detecting a tracking signal in accordance with a signal supplied from said photodetector and extracting wobble frequency components due to the wobble sections out of the tracking signal.

2. An optical information recording and reproducing device, for the use with respect to an optical recording medium, said optical recording medium having a plurality of lands and grooves between the lands, each of the lands and the grooves serving as a track on which a light beam is projected for recording, reproducing, and erasing information, wherein each track has at least one wobble section so that address information is recorded therein, the wobble section having a dispersively wobbled side wall of either the groove or the land, said optical information recording and reproducing device comprising:

a photodetector for detecting a quantity of reflected light obtained by projecting a light beam on said optical recording medium; and an operational unit for detecting changes in the quantity of the reflected light and extracting wobble frequency components due to the wobble section.

3. A method for manufacturing an optical recording medium, said optical recording medium having a plurality of lands and grooves between the lands, each of the lands and the grooves serving as a track on which a light beam is projected for recording, reproducing, and erasing information, wherein each track has at least one wobble section so that address information is recorded therein, the wobble section having a dispersively wobbled side wall of either the groove or the land, said method comprising the steps of:

(a) providing a photosensitive material over a substrate; and (b) selectively exposing the photosensitive material in a shape of the wobble section, by projecting two light beams with a distance therebetween in a direction orthogonal to a lengthwise direction of the track and swinging one of the two light beams in the direction orthogonal to the lengthwise direction of the track.

* * * * *

UNITED STATES PATENT AND TRADEMARK OFFICE
CERTIFICATE OF CORRECTION

PATENT NO. : 6,031,816
DATED : February 29, 2000
INVENTOR(S) : Tetsuya Inui et al.

It is certified that error appears in the above-identified patent and that said Letters Patent is hereby corrected as shown below:

On the title page, please insert--section [73] Assignee: Sharp Kabushiki Kaisha, Osaka, Japan---.

Signed and Sealed this

Twenty-seventh Day of February, 2001

Attest:

NICHOLAS P. GODICI

Attesting Officer        Acting Director of the United States Patent and Trademark Office